United States Patent
Khoshnevisan et al.

(10) Patent No.: US 12,341,722 B2
(45) Date of Patent: Jun. 24, 2025

(54) TECHNIQUES FOR DOWNLINK FEEDBACK FROM MULTIPLE TRANSMISSION AND RECEPTION POINTS

(71) Applicant: QUALCOMM Incorporated, San Diego, CA (US)

(72) Inventors: Mostafa Khoshnevisan, San Diego, CA (US); Xiaoxia Zhang, San Diego, CA (US); Jing Sun, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 427 days.

(21) Appl. No.: 17/855,997

(22) Filed: Jul. 1, 2022

(65) Prior Publication Data

US 2024/0007257 A1    Jan. 4, 2024

(51) Int. Cl.
*H04L 5/00* (2006.01)
*H04L 1/1812* (2023.01)
*H04W 72/23* (2023.01)
*H04L 1/18* (2023.01)

(52) U.S. Cl.
CPC .......... *H04L 5/0055* (2013.01); *H04L 1/1812* (2013.01); *H04W 72/23* (2023.01)

(58) Field of Classification Search
CPC ... H04L 5/0055; H04L 1/1812; H04L 5/0023; H04L 1/1864; H04L 1/189; H04L 1/1822; H04W 72/23
See application file for complete search history.

(56) References Cited

U.S. PATENT DOCUMENTS

| 11,296,827 B2* | 4/2022 | Yang ................... H04B 7/0645 |
| 11,831,438 B2* | 11/2023 | Noh ....................... H04L 1/1864 |
| 2021/0105750 A1* | 4/2021 | Khoshnevisan ...... H04L 1/1614 |
| 2021/0289540 A1 | 9/2021 | Khoshnevisan et al. |
| 2021/0321379 A1* | 10/2021 | Cirik ................... H04W 72/044 |

(Continued)

FOREIGN PATENT DOCUMENTS

WO    WO-2021098741 A1    5/2021

OTHER PUBLICATIONS

International Search Report and Written Opinion—PCT/US2023/024608—ISA/EPO—Aug. 21, 2023.

(Continued)

*Primary Examiner* — Eunsook Choi
(74) *Attorney, Agent, or Firm* — Dalei Dong; Holland & Hart LLP

(57) ABSTRACT

Methods, systems, and devices for wireless communications are described. A user equipment (UE) may transmit uplink messages to at least one TRP of a set of TRPs, where each uplink message is associated with a first control resource set (CORESET) pool index value or a second CORESET pool index value and is associated with a hybrid automatic repeat request (HARQ) identifier of a set of HARQ identifiers. In some cases, the UE may receive downlink feedback information (DFI) for the set of HARQ identifiers, wherein the DFI is associated with the first COREST pool index value or the second CORESET pool index value. Further, the DFI may be valid for at least one HARQ identifier of the set of HARQ identifiers based on a CORESET pool index value associated with the DFI and a CORESET pool index value associated with at least one uplink message.

28 Claims, 12 Drawing Sheets

(56) References Cited

U.S. PATENT DOCUMENTS

| | | | |
|---|---|---|---|
| 2022/0210800 A1* | 6/2022 | Babaei | H04L 5/0092 |
| 2022/0386339 A1* | 12/2022 | Fang | H04L 5/0055 |
| 2023/0164794 A1* | 5/2023 | Matsumura | H04L 1/1861 |
| | | | 370/329 |
| 2023/0354347 A1* | 11/2023 | Kim | H04L 1/0009 |

OTHER PUBLICATIONS

Moderator (NTT DOCOMO Inc): "Updated RAN1 UE Features List for Rel-16 NR After RAN1#108-e", 3GPP TSG RAN WG1 #108-e, R1-2202763, 3rd Generation Partnership Project, Mobile Competence Centre, 650, Route Des Lucioles, F-06921 Sophia-Antipolis Cedex, France, vol. RAN WG1, No. e-Meeting, Feb. 21, 2022-Mar. 3, 2022, pp. 1-72, Mar. 3, 2022, XP052122397, p. 63.

* cited by examiner

TECHNIQUES FOR DOWNLINK FEEDBACK FROM MULTIPLE TRANSMISSION AND RECEPTION POINTS

FIELD OF DISCLOSURE

The following relates to wireless communications, including techniques for downlink feedback from multiple transmission and reception points.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long-Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

SUMMARY

The described techniques relate to improved methods, systems, devices, and apparatuses that support techniques for downlink feedback from multiple transmission and reception points (TRPs). For example, the techniques described herein may enable a user equipment (UE) to validate downlink feedback information (DFI) from two or more TRPs for a set of hybrid automatic repeat request (HARQ) identifiers (ID). A UE may transmit one or more uplink messages to at least one TRP of a set of TRPs, where each uplink message is associated with a first control resource set (CORESET) pool index or a second CORESET pool index. Additionally, each uplink message may be associated with a HARQ ID of a set of HARQ IDs. In some cases, the UE may receive, from a TRP of the set of TRPs, a downlink message indicating DFI for the set of HARQ IDs, where the DFI is associated with the first CORESET pool index or the second CORESET pool index.

In some cases, the DFI may be valid for at least one HARQ ID of the set of HARQ IDs based on a CORESET pool index associated with the DFI and a CORESET pool index associated with at least one uplink message of the one or more uplink messages (e.g., an uplink message associated with the at least one HARQ ID). For example, the DFI for a first HARQ ID of the set of HARQ IDs may be valid based on the COREST pool index associated with the DFI being the same as the COREST pool index associated with the first uplink message. In such cases, the DFI for the first HARQ ID may be valid based on a first symbol of the downlink message occurring after a last symbol of a first uplink message associated with the first HARQ ID by a first time threshold. Alternatively, the COREST pool index associated with the DFI may be different than the COREST pool index associated with the first uplink message, and the DFI for the first HARQ ID may be valid based on the first symbol of the downlink message occurring after the last symbol of the first uplink message associated with the first HARQ ID by a second time threshold.

A method for wireless communications at a UE is described. The method may include transmitting one or more uplink messages to at least one TRP of a set of multiple TRPs, where each uplink message of the one or more uplink messages is associated with a first CORESET pool index value or a second CORESET pool index value, and where each uplink message is associated with a HARQ ID of a set of HARQ IDs. The method may include receiving, from a TRP of the set of multiple TRPs, a downlink message indicating DFI for the set of HARQ IDs, where the DFI is associated with the first CORESET pool index value or the second CORESET pool index value, and where the DFI is valid for at least one HARQ ID of the set of HARQ IDs based on a CORESET pool index value associated with the DFI and a CORESET pool index value associated with at least one uplink message of the one or more uplink messages.

An apparatus for wireless communications at a UE is described. The apparatus may include a processor, memory coupled with the processor, and instructions stored in the memory. The instructions may be executable by the processor to cause the apparatus to transmit one or more uplink messages to at least one TRP of a set of multiple TRPs, where each uplink message of the one or more uplink messages is associated with a first CORESET pool index value or a second CORESET pool index value, and where each uplink message is associated with an HARQ ID of a set of HARQ IDs and receive, from a TRP of the set of multiple TRPs, a downlink message indicating DFI for the set of HARQ IDs, where the DFI is associated with the first CORESET pool index value or the second CORESET pool index value, and where the DFI is valid for at least one HARQ ID of the set of HARQ IDs based on a CORESET pool index value associated with the DFI and a CORESET pool index value associated with at least one uplink message of the one or more uplink messages.

Another apparatus for wireless communications at a UE is described. The apparatus may include means for transmitting one or more uplink messages to at least one TRP of a set of multiple TRPs, where each uplink message of the one or more uplink messages is associated with a first CORESET pool index value or a second CORESET pool index value, and where each uplink message is associated with an HARQ ID of a set of HARQ IDs and means for receiving, from a TRP of the set of multiple TRPs, a downlink message indicating DFI for the set of HARQ IDs, where the DFI is associated with the first CORESET pool index value or the second CORESET pool index value, and where the DFI is valid for at least one HARQ ID of the set of HARQ IDs based on a CORESET pool index value associated with the DFI and a CORESET pool index value associated with at least one uplink message of the one or more uplink messages.

A non-transitory computer-readable medium storing code for wireless communications at a UE is described. The code may include instructions executable by a processor to transmit one or more uplink messages to at least one TRP of a set of multiple TRPs, where each uplink message of the one or more uplink messages is associated with a first CORESET pool index value or a second CORESET pool index value, and where each uplink message is associated with an HARQ ID of a set of HARQ IDs and receive, from a TRP of the set of multiple TRPs, a downlink message indicating DFI for the set of HARQ IDs, where the DFI is associated with the first CORESET pool index value or the second CORESET pool index value, and where the DFI is valid for at least one HARQ ID of the set of HARQ IDs based on a CORESET pool index value associated with the DFI and a CORESET pool index value associated with at least one uplink message of the one or more uplink messages.

Some examples of the method, apparatuses, and non-transitory computer-readable medium described herein may further include operations, features, means, or instructions for determining that the DFI for a first HARQ ID of the set of HARQ IDs may be valid based on a first symbol of the downlink message occurring after a last symbol of a first uplink message associated with the first HARQ ID by a first time threshold, where the first time threshold may be used for identifying a latest-transmitted uplink message associated with at least one HARQ ID of the set of HARQ IDs.

Some examples of the method, apparatuses, and non-transitory computer-readable medium described herein may further include operations, features, means, or instructions for determining that the DFI for the first HARQ ID of the set of HARQ IDs may be valid based on the CORESET pool index value associated with the DFI being the same as a CORESET pool index value associated with the first uplink message.

Some examples of the method, apparatuses, and non-transitory computer-readable medium described herein may further include operations, features, means, or instructions for determining that the DFI for the first HARQ ID of the set of HARQ IDs may be valid based on the first symbol of the downlink message occurring after the last symbol of the first uplink message associated with the first HARQ ID by a second time threshold, where the CORESET pool index value associated with the DFI may be different than a CORESET pool index value associated with the first uplink message.

Some examples of the method, apparatuses, and non-transitory computer-readable medium described herein may further include operations, features, means, or instructions for receiving control signaling indicating the second time threshold.

In some examples of the method, apparatuses, and non-transitory computer-readable medium described herein, the second time threshold may be greater than or equal to the first time threshold that may be used for identifying the latest-transmitted uplink message associated with the at least one HARQ ID of the set of HARQ IDs.

Some examples of the method, apparatuses, and non-transitory computer-readable medium described herein may further include operations, features, means, or instructions for receiving a control message indicating that each TRP of the set of multiple TRPs transmits respective DFI and determining whether the DFI may be valid based on the control message.

In some examples of the method, apparatuses, and non-transitory computer-readable medium described herein, receiving the downlink message may include operations, features, means, or instructions for receiving the downlink message via a CORESET associated with the first CORESET pool index value or the second CORESET pool index value, where the CORESET pool index value associated with the DFI corresponds to the first CORESET pool index value or the second CORESET pool index value associated with the CORESET used for receiving the downlink message.

Some examples of the method, apparatuses, and non-transitory computer-readable medium described herein may further include operations, features, means, or instructions for receiving, within the downlink message, an indication of the CORESET pool index value associated with the DFI.

Some examples of the method, apparatuses, and non-transitory computer-readable medium described herein may further include operations, features, means, or instructions for identifying a latest-transmitted uplink message of the one or more uplink messages for each HARQ ID of the set of HARQ IDs, the latest-transmitted uplink message for each HARQ ID may be identified based on a first symbol of the downlink message occurring after a last symbol of each latest-transmitted first uplink message by a time threshold and determining whether the DFI may be valid based on the latest-transmitted uplink message for each HARQ ID.

Some examples of the method, apparatuses, and non-transitory computer-readable medium described herein may further include operations, features, means, or instructions for determining the CORESET pool index value associated with the at least one uplink message based on a CORESET pool index value associated with a respective control message scheduling the at least one uplink message, where the CORESET pool index value associated with the respective control message may be based on a CORESET used for receiving the respective control message.

Some examples of the method, apparatuses, and non-transitory computer-readable medium described herein may further include operations, features, means, or instructions for receiving one or more control messages indicating one or more configured grant configurations associated with the one or more uplink messages, where each of the one or more configured grant configurations indicates the first CORESET pool index value or the second CORESET pool index value, and where the CORESET pool index value associated with each of the one or more uplink messages may be based on the one or more configured grant configurations.

Some examples of the method, apparatuses, and non-transitory computer-readable medium described herein may further include operations, features, means, or instructions for receiving one or more control messages indicating one or more configured grant configurations associated with the one or more uplink messages, where respective downlink control information activating each of the one or more configured grant configurations may be received via a respective CORESET associated with the first CORESET pool index value or the second CORESET pool index value, and where the CORESET pool index value associated with each of the one or more uplink messages may be based on the first CORESET pool index value or the second CORESET pool index value associated with the respective CORESET used to receive the respective downlink control information.

In some examples of the method, apparatuses, and non-transitory computer-readable medium described herein, the CORESET pool index value associated with each of the one or more uplink messages may be based on a respective HARQ ID of the set of HARQ IDs that may be associated with each uplink message and each HARQ ID corresponds to the first CORESET pool index value or the second CORESET pool index value.

In some examples of the method, apparatuses, and non-transitory computer-readable medium described herein, the first CORESET pool index value may be associated with a first TRP of the set of multiple TRPs and the second CORESET pool index value may be associated with a second TRP of the set of multiple TRPs.

DETAILED DESCRIPTION

Figure 1:
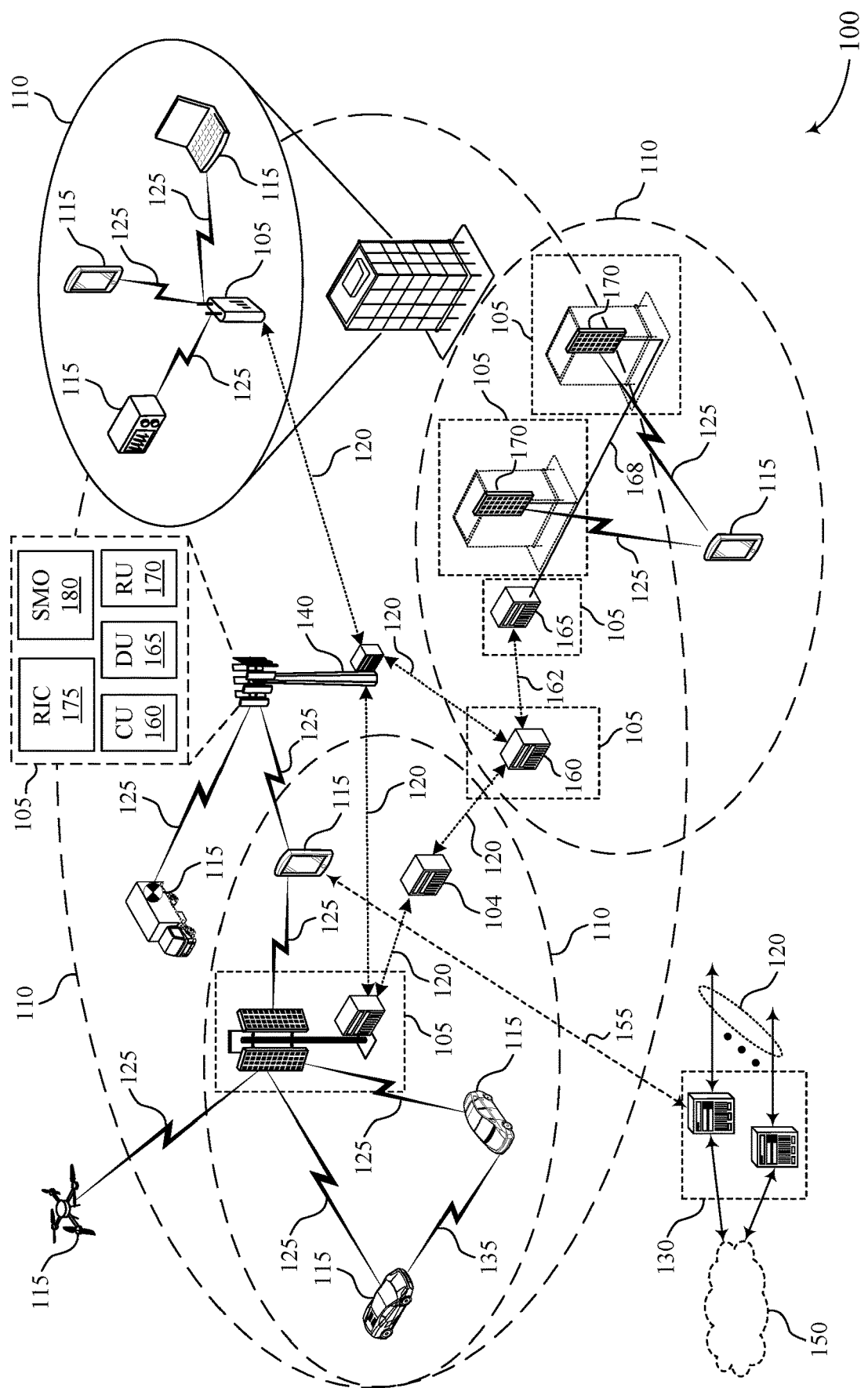
FIG. 1 illustrates an example of a wireless communications system that supports techniques for downlink feedback from multiple transmission and reception points in accordance with one or more aspects of the present disclosure.

Some wireless communications systems may support communications with transmission and reception points (TRPs), which may be referred to as multi-TRP (mTRP) communications, in which a user equipment (UE) communicates with multiple TRPs. Additionally, each TRP of the multiple TRPs may transmit separate downlink control information (DCI) to the UE (e.g., which may be referred to as mTRP multi-DCI communications). In some cases, the UE may transmit uplink messages to each TRP of the multiple TRPs and each uplink message may be associated with a hybrid automatic repeat request (HARQ) identifier from a set of HARQ identifiers (IDs) (e.g., a set of 16 HARQ IDs), such that the UE may expect to receive feedback for the set of HARQ IDs, which may be referred to as downlink feedback information (DFI). The UE may receive, from a first TRP of the multiple TRPs, a downlink message (e.g., DCI) indicating DFI associated with the set of HARQ IDs. However, determining whether the DFI is valid in the presence of multiple TRPs may be challenging. For example, the DFI may include HARQ feedback for all HARQ IDs (e.g., all 16 HARQ IDs), but decoding information for an uplink transmission received at a first TRP may not be available at second, different TRP. Thus, the second TRP may be unable to transmit DFI to the UE including HARQ feedback for the HARQ IDs without some latency (e.g., based on a time for the respective TRPs to communicate decoding results for messages received from the UE, which may be exacerbated in cases of a non-ideal backhaul link between the TRPs). In addition, respective HARQ IDs may not be associated with one TRP or another (e.g., each HARQ ID may be used by any TRP at different scheduling instances), and determination of the validity of DFI included in a single message from one TRP may be difficult.

Techniques described herein may enable a UE to determine whether DFI associated with at least one HARQ ID of a set of HARQ IDs is valid when communicating with multiple TRPs. For example, the UE may receive a downlink message (e.g., DCI) including DFI for a set of HARQ IDs from at least one TRP. Each HARQ ID of the set of HARQ IDs may be associated with one or more uplink messages transmitted to a first TRP (e.g., corresponding to a first control resource set (COREST) pool index) or transmitted to a second TRP (e.g., corresponding to a second CORESET pool index). In some cases, the UE may determine that DFI associated with a HARQ ID of the set of HARQ IDs is valid based on a first symbol of the downlink message occurring after a last symbol of an uplink message associate with the HARQ ID by a first time threshold. Additionally, the UE may determine that the DFI associated with the HARQ ID is valid based on a CORESET pool index associated with the DFI being the same as a CORESET pool index associated with the uplink message corresponding to the HARQ ID. In other examples, the CORESET pool index associated with the DFI may be different than the CORESET pool index associated with the uplink message, and the UE may determine that the DFI is valid based on the first symbol of the downlink message occurring after the last symbol of the first uplink message associated with the HARQ ID by a second time threshold, where the second time threshold is greater than or equal to the first time threshold.

Aspects of the disclosure are initially described in the context of wireless communications systems. Aspects of the disclosure are then described in the context of validation procedures and a process flow, Aspects of the disclosure are further illustrated by and described with reference to apparatus diagrams, system diagrams, and flowcharts that relate to techniques for downlink feedback from multiple transmission and reception points.

FIG. 1 illustrates an example of a wireless communications system 100 that supports techniques for downlink feedback from multiple transmission and reception points in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending upon which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

In the case of the techniques described herein applied in the context of a disaggregated RAN architecture, one or more components of the disaggregated RAN architecture may be configured to support techniques for downlink feedback from multiple transmission and reception points as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and N f may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., N f) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). For example, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along some orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with some orientation (e.g., with respect to the antenna array of the transmitting device or receiving device, or with respect to some other orientation).

The UEs 115 and the network entities 105 may support retransmissions of data to increase the likelihood that data is received successfully. Hybrid automatic repeat request (HARQ) feedback is one technique for increasing the likelihood that data is received correctly via a communication link (e.g., a communication link 125, a D2D communication link 135). HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, in which case the device may provide HARQ feedback in a specific slot for data received via a previous symbol in the slot. In some other examples, the device may provide HARQ feedback in a subsequent slot, or according to some other time interval.

The wireless communications system 100 may support DFI for multiple TRPs. For example, a UE 115 may transmit one or more uplink messages to at least one TRP of a set of TRPs, where each uplink message of the one or more uplink messages is associated with a first CORESET pool index or a second CORESET pool index (e.g., based on which TRP the UE 115 is communicating with). Additionally, each uplink message may be associated with a HARQ identifier of a set of HARQ identifiers. In some cases, the UE 115 may receive, from a TRP of the set of TRPs, a downlink message (e.g., a PDCCH transmission carrying DCI) indicating DFI for the set of HARQ identifiers, where the DFI is associated with the first COREST pool index or the second CORESET pool index. In some examples, the validity of DFI for a PUSCH with a given HARQ process number (e.g., HARQ ID) may be based on when the uplink message (e.g., PUSCH transmission) is received with respect to the first symbol of the downlink message (e.g., DCI) carrying the DFI. As an example, for an uplink configured-grant transmission (e.g., a PUSCH transmission configured by ConfiguredGrantConfig), HARQ-ACK information for a transport block of a corresponding HARQ process number may be valid if a first symbol of the PDCCH reception is after a last symbol of the PUSCH transmission, or of any repetition of the PUSCH transmission, by a quantity of symbols provided by a threshold (e.g., cg-minDFI-Delay). In other examples, for an uplink transmission scheduled by a dynamic grant (e.g., a PUSCH transmission scheduled by some DCI format), HARQ-ACK information for a transport block of a corresponding HARQ process number may be valid if a first symbol of the PDCCH reception is after a last symbol of the PUSCH transmission by a quantity of symbols provided by the threshold (e.g., cg-minDFI-Delay). In cases where the uplink message is transmitted over multiple time intervals (e.g., the PUSCH transmission is over multiple slots), the HARQ-ACK information for a transport block of a corresponding HARQ process number may be valid if a first symbol of the PDCCH reception is after a last symbol of the PUSCH transmission in a first slot from the multiple slots by a quantity of symbols provided by the threshold (e.g., cg-minDFI-Delay) and if a value of the HARQ-ACK information is an acknowledgment (ACK). Alternatively, the HARQ-ACK information for a transport block of a corresponding HARQ process number may be valid if a first symbol of the PDCCH reception is after a last symbol of the PUSCH transmission in a last slot from the multiple slots by a number of symbols provided by the threshold (e.g., cg-minDFI-Delay) and if a value of the HARQ-ACK information is a negative acknowledgment (NACK). Further, as described herein, the UE 115 may determine whether the DFI is valid (e.g., validate the DFI) based on a CORESET pool index associated with the DFI and a CORESET pool index associated with at least on uplink message of the one or more uplink messages.

For example, the UE 115 may determine that the DFI is valid for the first HARQ identifier based on a first symbol of the downlink message occurring after a last symbol of a first uplink message associated with the first HARQ identifier by a first time threshold. In some cases, the first time threshold may be used for identifying a latest-transmitted uplink message associated with at least one HARQ identifier of the set of HARQ identifiers. Additionally, the UE 115 may determine that the DFI is valid based on the CORESET pool index associated with the DFI being the same as a CORESET pool index associated with the first uplink message. In some examples, the UE 115 may determine that the DFI is valid based on the first symbol of the downlink message occurring after the last symbol of the first uplink message associated with the first HARQ identifier by a second time threshold, where the CORESET pool index associated with the DFI is different than the CORESET pool index associated with the first uplink message.

Figure 2:
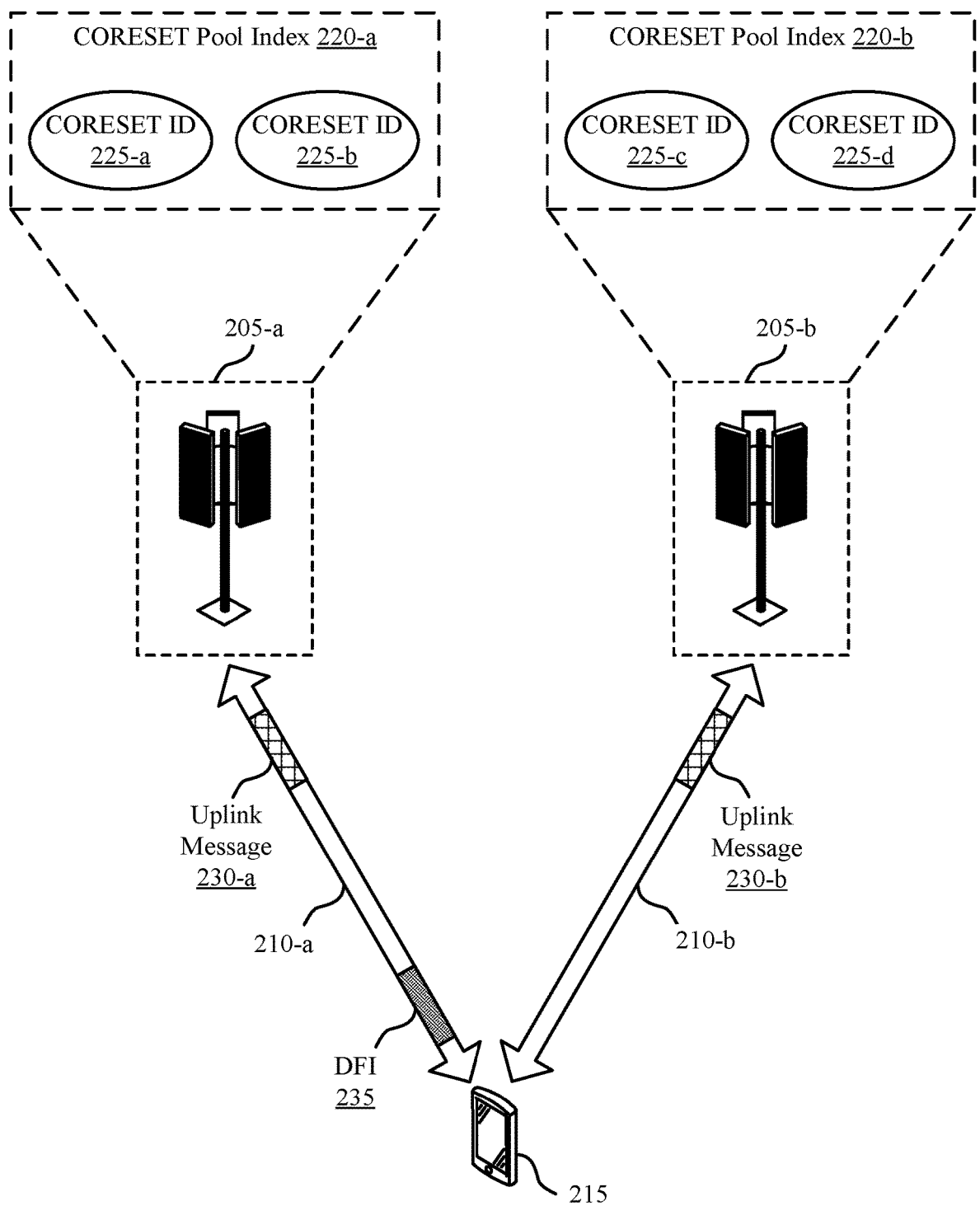
FIG. 2 illustrates an example of a wireless communications system that supports techniques for downlink feedback from multiple transmission and reception points in accordance with one or more aspects of the present disclosure.

FIG. 2 illustrates an example of wireless communications system 200 that supports techniques for downlink feedback from multiple TRPs in accordance with one or more aspects of the present disclosure. In some examples, the wireless communications system 200 may implement or be implemented by aspects of the wireless communications system 100. For example, the wireless communications system 200 may be implemented by one or more network entities 205 (e.g., a network entity 205-a and a network entity 205-b) and one or more UEs 215, which may be examples of the corresponding devices as described herein with reference to FIG. 1. In the example of FIG. 2, the network entity 205-a and/or the network entity 205-b may be an example of a CU 160, a DU 165, an RU 170, a base station 140, an IAB node 104, or one or more other network nodes as described herein with reference to FIG. 1. In some aspects, the network entity 205-a may transmit DFI 235 to the UE 215 via a communication link 210-a, and the UE 215 may determine whether the DFI is valid for one or more HARQ IDs based on one or more rules.

The wireless communications system 200 may support multi-TRP communications. For example, a UE 215 may communicate with multiple TRPs in uplink and downlink. In the examples illustrated by FIG. 2, different TRPs are shown as respective network entities 205, but a single network entity 205 may have two or more TRPs, and the examples described herein should not be considered limiting to the claims or the disclosure. That is, each network entity 205 may be associated with one or more TRPs.

In some aspects, multiple DCI may be transmitted to the UE 215, where each TRP may transmit respective DCI. For instance, the UE 215 may receive a first DCI from a first network entity (e.g., network entity 205-a), and the DCI may schedule one or more downlink messages (e.g., physical downlink shared channel (PDSCH) transmissions) or one or more uplink messages (e.g., physical uplink shared channel (PUSCH) transmissions). The UE 215 may also receive a second DCI from a second network entity (e.g., network entity 205-b), scheduling one or more downlink messages or one or more uplink messages. Respective communications with each TRP may, in some cases, be associated with different CORESET pool index values. For example, the UE 215 may receive a control message configuring the UE 215 for multi-TRP communications (e.g., in a given component carrier based on PDCCH-Config that contains two different values of CORESETPoolIndex in CORESETs for an active BWP of a serving cell). That is, each TRP may be associated with a respective CORESET pool index 220 (e.g., CORESET pool index 220-a, CORESET pool index 220-b) having some value (e.g., 0 or 1). Each CORESET pool index 220 may be associated with one or more CORESET IDs corresponding to a respective CORESET. Additionally, the UE 215 may differentiate between the TRPs (e.g., the network entity 205-a and the network entity 205-b) based on respective CORESET pool indices.

In some cases, the UE 215 may use a CORESET pool index of a CORESET in which the UE 215 receives a control message (e.g., DCI) for transmitting feedback (e.g., HARQ-Acknowledgment (HARQ-ACK)). For example, the UE 215 may be configured to transmit joint or separate feedback in response to downlink messages (e.g., HARQ-ACK for physical downlink control channel (PDCCH)). In some scenarios (e.g., an ideal backhaul between the first network entity 205 and the second network entity), the UE 215 may be configured (e.g., via ackNackFeedbackMode=joint) to transmit joint feedback on uplink resources (e.g., physical uplink control channel (PUCCH) resources). In some other cases (e.g., ideal backhaul or non-ideal backhaul between the first network entity 205 and the second network entity), the UE 215 may be configured (e.g., via ackNackFeedbackMode=separate) to transmit separate feedback on uplink resources. That is, the UE 215 may transmit separate feedback for downlink messages associated with a first CORESET pool index and for downlink messages associated with a second CORESET pool index. Uplink resources that contain feedback for different CORESET pool indices may be included in the same slot (e.g., but not overlapping). For example, the UE 215 may time division multiplex (TDM) feedback for the downlink messages associated with the first CORESET pool index 220 with feedback for the downlink messages associated with the second CORESET pool index 220 (e.g., two PUCCHs can be transmitted simultaneously).

Additionally, or alternatively, the UE 215 may receive a downlink message (e.g., DCI), from a network entity 205, indicating DFI (e.g., PUSCH HARQ-ACK) based on one or more uplink messages (e.g., PUSCH transmissions). The UE 215 may receive an indication of whether an uplink message is received (e.g., correctly decoded) by a network entity 205 based on the DFI. In some cases, the uplink messages may be associated with a dynamic grant (e.g., based on scheduling information included in DCI) or associated with a configured grant (CG) (e.g., CG-PUSCH), such that resources associated with the CG may support retransmissions. Additionally, the UE 215 may select a HARQ ID, new data indicator (NDI) (e.g., NDI may be toggled for a new transmission and not toggled for a retransmission), and redundancy version (RV) for each CG occasion. In some cases, a network entity 205 may receive an uplink message associated with a CG and may decode the uplink message based on uplink control information (UCI) associated with the CG and multiplexed with the uplink message. That is, the network entity 205 may decode the UCI and then decode the uplink message (e.g., uplink data on the CG-PUSCH). The UCI may include a HARQ ID, RV, NDI, and channel occupancy time (COT) sharing info (e.g., related to unlicensed operation). In some cases, the UE 215 may encode the UCI separately from the uplink message.

In some cases, the network entity 205 may transmit a downlink message (e.g., DCI) including the DFI which may indicate feedback information (e.g., HARQ-ACK) for each HARQ ID associated with previous uplink messages (e.g., one or more previous PUSCH transmissions corresponding to a CG-PUSCH or a dynamic grant PUSCH). In some examples, the downlink message may include a flag associated with the DFI (e.g., a DFI flag may be added to DCI format 0_1 with CRC scrambled by configured scheduling-radio network temporary identifier (CS-RNTI)). For example, the flag may indicate a value of 0 which may indicate that no DFI is included in the downlink message (e.g., the DCI may be a normal uplink DCI and may activate CG-PUSCH). In another example, the flag may indicate a value of 1 which may further indicate that DFI is included in the downlink message (e.g., 16 bits indicating HARQ-ACK for each HARQ ID for the previous PUSCH transmissions).

In some cases (e.g., non-ideal backhaul), the network entities 205 may transmit separate DFI (e.g., in multi-DCI based uplink operations). For example, the DFI may include acknowledgment feedback (e.g., HARQ-ACK) for a set of HARQ IDs (e.g., 16 HARQ IDs). A first network entity 205 (e.g., network entity 205-a) may transmit DFI for the set of HARQ IDs, however, a subset of HARQ IDs from the set of HARQ IDs may be associated with one or more uplink messages transmitted to a second network entity 205 (e.g., network entity 205-b) and the first network entity 205 may not be aware of whether the one or more uplink messages transmitted to the second network entity 205 were received and/or decoded successfully. That is, the second network entity 205 may not (e.g., may not be able to) communicate, to the second network entity 205, DFI for the one or more messages associated with the subset of HARQ IDs prior to the first network entity 205 transmitting a downlink message containing DFI (e.g., 16 bits HARQ-ACK bitmap in one DCI). As such, it may be difficult for the UE 215 to determine whether DFI for the subset of HARQ IDs associated with the one or more uplink messages in the DFI (e.g., joint DFI) is valid. Further, each HARQ ID may be used by either network entity 205 at different scheduling instances such that a semi-static split may not exist between HARD IDs (e.g., from the point of view of the UE 215). As such, techniques for validating DFI may be desirable.

Techniques described herein may enable a UE 215 to determine that DFI 235 for a HARQ ID of a set of HARQ IDs is valid based on a CORESET pool index associated with the DFI 235 and a CORESET pool index associated with at least one uplink message transmitted by the UE 215 to one or more TRPs of a set of TRPs, such as the network entity 205-a or the network entity 205-b. For example, the UE 215 may transmit, to the network entity 205-a, an uplink message 230-a associated with a first HARQ ID via the communication link 210-a and transmit, to the network entity 205-b, an uplink message 230-b associated with a second HARQ ID via a communication link 210-b. In some cases, a TRP corresponding to the network entity 205-a may be associated with a CORESET pool index 220-a, which may be further associated with a CORESET ID 225-a and a CORESET ID 225-b. Similarly, a TRP corresponding to the network entity 205-b may be associated with a CORESET pool index 220-b that is further associated with a CORESET ID 225-c and a CORESET ID 225-d. In some cases, the CORESET pool index 220-a may be different than the CORESET pool index 220-a. Additionally, the CORESET IDs 225 may be unique. In some cases, the network entity 205-a may transmit (e.g., via DCI), to the UE 215, DFI 235 for the first HARQ ID and the second HARQ ID. The UE 215 may validate the DFI 235 associated with the first HARQ ID and the second HARQ ID based on a CORESET pool index 220 associated with the DFI 235 and a CORE-SET pool index 220 associated with at least one of the uplink message 230-a or the uplink message 230-b.

For example, the UE 215 may determine whether the DFI 235 is valid for the first HARQ ID based on a first symbol of the downlink message carrying the DFI 235 occurring after a last symbol of the uplink message 230-a associated with the first HARQ ID by a first time threshold. Further, the UE 215 may determine whether the DFI 235 is valid for the first HARQ ID based on the CORESET pool index associated with the DFI 235 being the same as a CORESET pool index associated with the uplink message 230-a, as described with reference to FIG. 3A.

In another example, the UE 215 may determine that the DFI 235 is valid for the second HARQ ID based on a first symbol of the downlink message carrying the DFI 235 occurring after a last symbol of the uplink message 230-b associated with the second HARQ ID by the first time threshold. Further, the UE 215 may determine that the DFI 235 is valid for the second HARQ ID based on the first symbol of the downlink message carrying the DFI 235 occurring after the last symbol of the uplink message 230-b associated with the second HARQ ID by a second time threshold, where the CORESET pool index associated with the DFI 235 is different than a CORESET pool index associated with the uplink message 230-b, as described with reference to FIG. 3B.

Figure 3A:
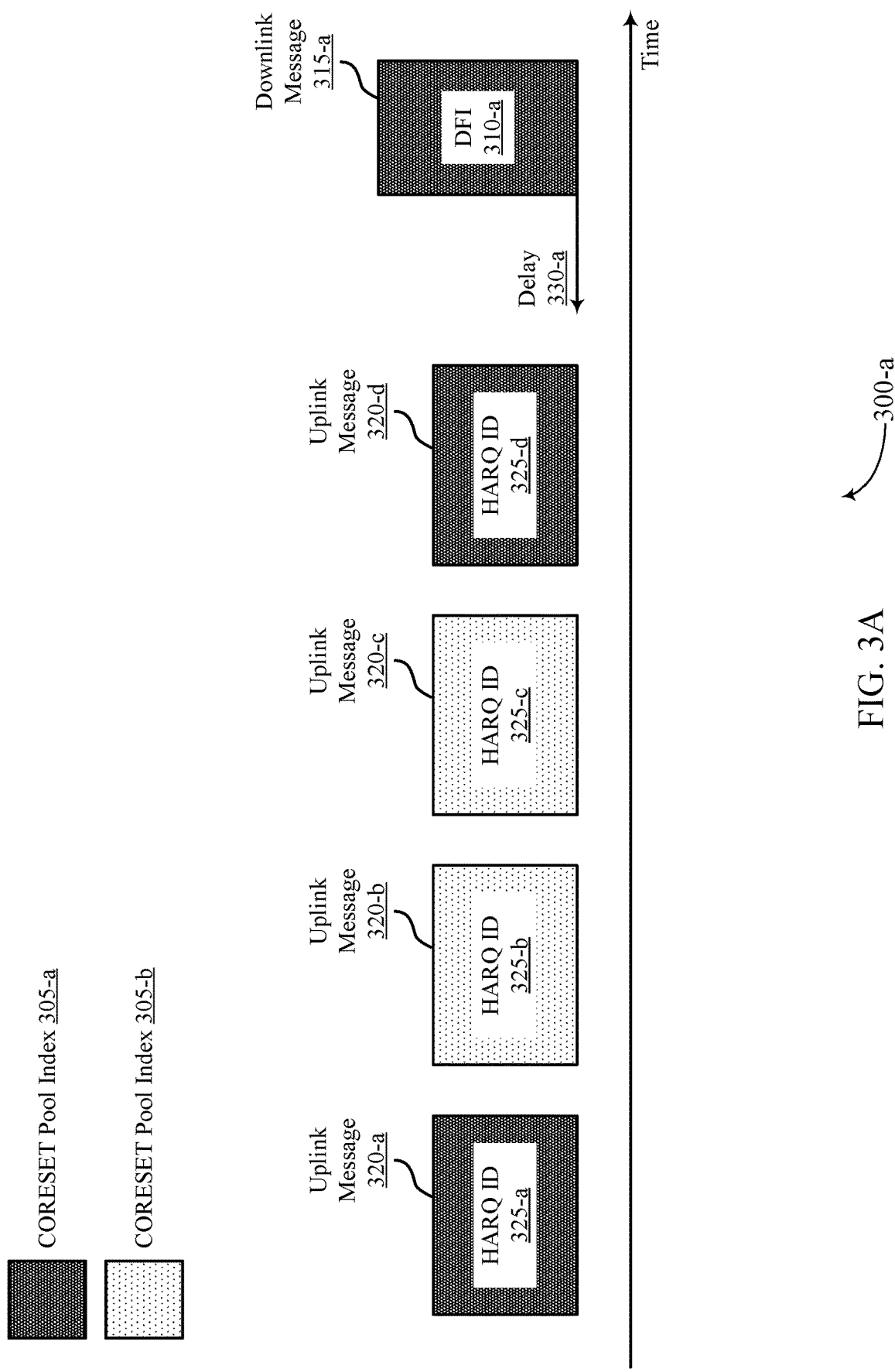
FIGS. 3A and 3B illustrate examples of validation procedures that supports techniques for downlink feedback from multiple transmission and reception points in accordance with one or more aspects of the present disclosure.
Figure 3B:
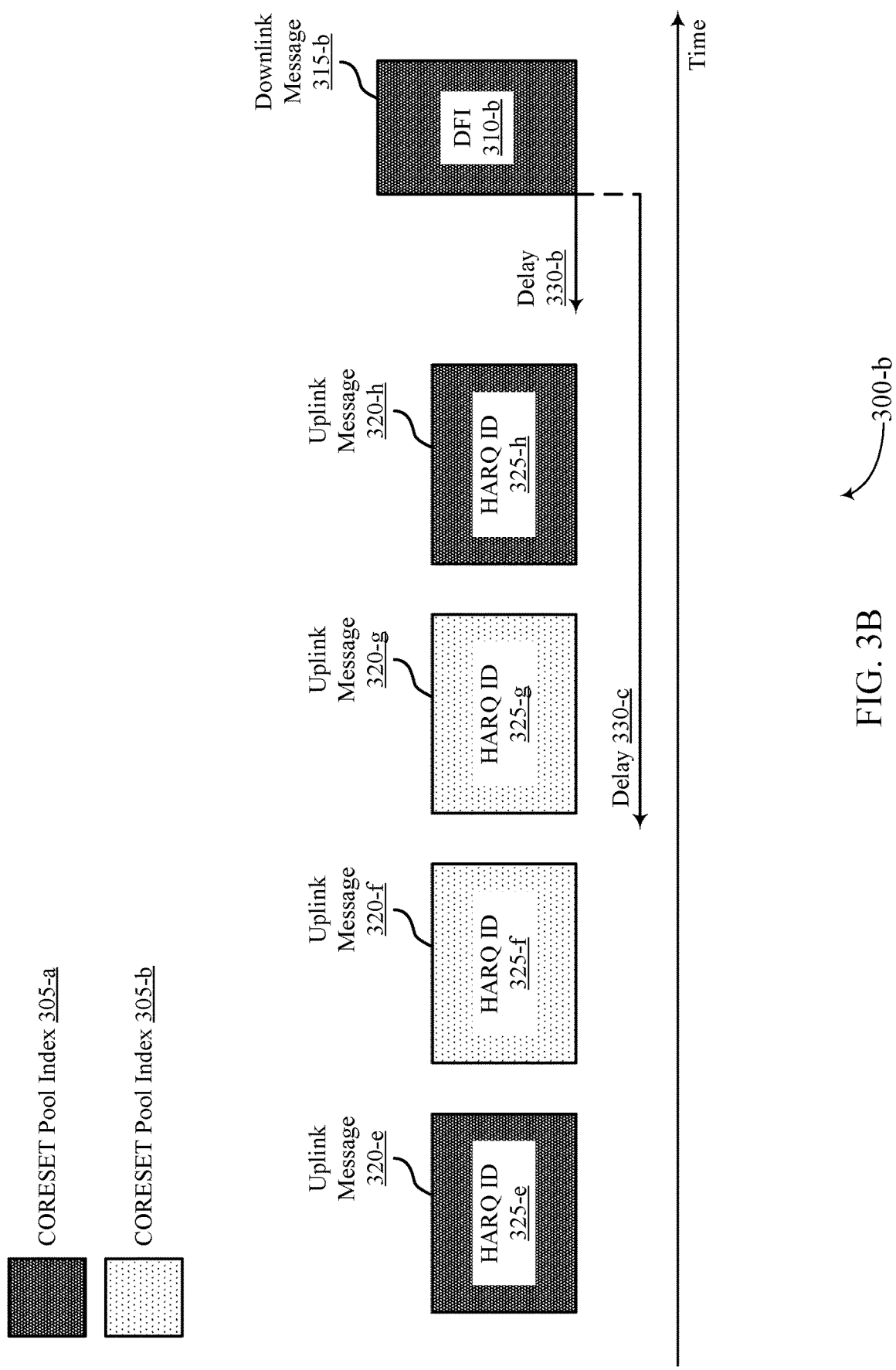

FIGS. 3A and 3B illustrate examples of validation procedures 300 (e.g., validation procedure 300-a, validation procedure 300-b) that support techniques for downlink feedback from multiple TRPs in accordance with one or more aspects of the present disclosure. In some examples, the validation procedures 300 may implement or be implemented by aspects of the wireless communications system 100 and the wireless communications system 200. For example, the validation procedures 300 may be implemented by one or more network entities 105 and one or more UEs 115, which may be examples of the corresponding devices as described herein with reference to FIG. 1. That validation procedures 300 may support the validation of DFI for one or more HARQ IDs that are each associated with uplink messages transmitted by a UE to multiple TRPs.

In some cases, in the examples of the validation procedure 300-a and the validation procedure 300-b, a UE may be configured with multiple (e.g., two) CORESET pool index 305 values, such as a CORESET pool index 305-a and a CORESET pool index 305-b (e.g., in a component carrier). In some cases, each CORESET pool index 305 may be associated with a different TRP (e.g., corresponding to one or more network entities 105), such as a first TRP and a second TRP. Additionally, the UE may validate DFI 310 (e.g., the UE may determine whether any portion of the DFI is valid) received from the first TRP, the second TRP, or both (e.g., separate DFI is RRC configured) via a downlink message 315 (e.g., downlink message 315-a, downlink message 315-b).

In some cases, according to a validation procedure 300-a, the UE may transmit one or more uplink messages 320, where each uplink message 320 is associated with a HARQ ID 325 from a set of HARQ IDs 325 (e.g., HARQ ID 325-a, HARQ ID 325-b, HARQ ID 325-c, and so forth). For example, the UE may transmit, to the first TRP associated with the CORESET pool index 305-a, an uplink message 320-a associated with a HARQ ID 325-a and an uplink message 320-d associated with a HARQ ID 325-a. Additionally, the UE may transmit, to the second TRP associated with the CORESET pool index 305-b, an uplink message 320-*b* associated with a HARQ ID 325-*b* and an uplink message 320-*c* associated with a HARQ ID 325-*c*.

In some cases, the UE may receive a downlink message 315-*a* (e.g., DCI format 0_1 with CRC scrambled by CS-RNTI) indicating the DFI 310-*a* (e.g., a DFI flag in the DCI is set to 1) for the set of HARQ IDs 325, including the HARQ ID 325-*a*, the HARQ ID 325-*b*, the HARQ ID 325-*c*, and the HARQ ID 325-*d*. Additionally, the UE may determine a CORESET pool index 305 associated with the DFI 310-*a*. In some cases, the CORESET pool index 305 associated with the DFI 310-*a* may be based on a CORESET pool index 305 in which the downlink message 315-*a* is received. For example, the UE may receive the downlink message 315-*a* in the CORESET pool index 305-*a* and, as such, the DFI 310-*a* may be associated with the CORESET pool index 305-*a*. In some other cases, the downlink message 315-*a* may include a field indicated the CORESET pool index 305 associated with the DFI 310-*a*.

In some cases, the UE may determine a latest transmitted uplink message 320 with a last symbol at least a delay 330-*a* before a first symbol of the downlink message 315-*a* (e.g., for each HARQ ID 325). The delay 330-*a* may be a quantity of symbols. Additionally, the UE may determine a CORESET pool index 305 associated with each uplink message 320. In some cases (e.g., DG-PUSCH or CG-PUSCH), the CORESET pool index 305 associated with each uplink message 320 may be based on a control message scheduling the uplink message 320. For example, the UE may receive a control message scheduling the uplink message 320-*a* in a CORESET associated with the CORESET pool index 305-*a* and, as such, the uplink message 320-*a* may be associated with the CORESET pool index 305-*a*. In some other cases (e.g., CG-PUSCH), the CORESET pool index 305 associated with each uplink message 320 may be based on a CG configuration (e.g., RRC configured). For example, the uplink message 320-*b* may be associated with a CG configuration that indicates the CORESET pool index 305-*b* and, as such, the uplink message 320-*b* may be associated with the CORESET pool index 305-*b*. In some other cases (e.g., CG-PUSCH), the CORESET pool index 305 associated with each uplink message 320 may be based on a control message (e.g., DCI) activating a CG configuration. For example, the UE may receive a control message via a CORESET associated with the CORESET pool index 305-*b*, where the control message activates a CG configuration associated with the uplink message 320-*c*. As such, the uplink message 320-*c* may be associated with the CORESET pool index 305-*b*. Alternatively, each HARQ ID 325 may be associated (e.g., directly) with a CORESET pool index 305 (e.g., semi-static split between HARQ IDs 325 across two TRPS). For example, the HARQ ID 325-*d* may be associated with the CORESET pool index 305-*a* such that the uplink message 320-*d* is associated with the CORESET pool index 305-*a*.

In some cases, the UE may determine whether DFI 310-*a* for a HARQ ID 325 is valid based on a last symbol of a respective uplink message 320 being at least a threshold or delay 330-*a* (e.g., cg-minDFI-delay) before the first symbol of the downlink message 315-*a*. Additionally, the UE may determine that DFI 310-*a* for the HARQ ID 325 is valid based on a CORESET pool index 305 associated with the respective uplink message 320 being the same as the CORESET pool index 305 associated with the DFI 310-*a*. For example, the UE may determine that DFI 310-*a* is associated with the HARQ ID 325-*a* and the HARQ ID 325-*d* is valid based on a last symbol of the uplink message 320-*a* and the uplink message 320-*d* being at least the delay 330-*a* before the first symbol of the downlink message 315-*a*, and based on the uplink message 320-*a* and the uplink message 320-*d* being associated with the CORESET pool index 305-*a*. Conversely, the UE may determine that DFI 310-*a* is associated with the HARQ ID 325-*b* and the HARQ ID 325-*c* is not valid based on the uplink message 320-*b* and the uplink message 320-*c* being associated with the CORESET pool index 305-*b* (e.g., even though a last symbol of the uplink message 320-*b* and the uplink message 320-*c* are at least the delay 330-*a* before the first symbol of the downlink message 315-*a*).

In some examples, an uplink message 320 (e.g., PUSCH repetitions), associated with a CORESET pool index 305 that is the same as the CORESET pool index 305 associated with the DFI 310-*a*, may occur over multiple slots such that the DFI 310-*a* may be valid for a HARQ ID 325 based on a last symbol of the uplink message 320 in a first slot from the multiple slots by the delay 330-*a* (e.g., if the DFI 310-*a* for the HARQ ID 325 is ACK). Similarly, an uplink message 320, associated with a CORESET pool index 305 that is the same as the CORESET pool index 305 associated with the DFI 310-*a*, may occur over multiple slots such that the DFI 310-*a* may be valid for a HARQ ID 325 based on a last symbol of the uplink message 320 in a last slot from the multiple slots by the delay 330-*c* (e.g., if the DFI 310-*a* for the HARQ ID 325 is NACK).

Additionally, or alternatively, according to a validation procedure 300-*b*, the UE may transmit, to the first TRP associated with the CORESET pool index 305-*a*, an uplink message 320-*e* associated with a HARQ ID 325-*e* and an uplink message 320-*h* associated with a HARQ ID 325-*h*. Additionally, the UE may transmit, to the second TRP associated with the CORESET pool index 305-*b*, an uplink message 320-*f* associated with a HARQ ID 325-*g* and an uplink message 320-*c* associated with a HARQ ID 325-*g*.

In some cases, the UE may receive a downlink message 315-*b* indicating the DFI 310-*b* for the set of HARQ IDs 325, including the HARQ ID 325-*e*, the HARQ ID 325-*f*, the HARQ ID 325-*g*, and the HARQ ID 325-*h*. Additionally, the UE may determine a CORESET pool index 305 associated with the DFI 310-*b*, as described with reference to the validation procedure 300-*a*. For example, the UE may determine that the DFI 310-*b* is associated with the CORESET pool index 305-*a*.

In some cases, the UE may determine a latest transmitted uplink message 320 with a last symbol at least a delay 330-*b* before a first symbol of the downlink message 315-*b* (e.g., for each HARQ ID 325). Additionally, the UE may determine a CORESET pool index 305 associated with each uplink message 320, described with reference to the validation procedure 300-*a*. For example, the UE may determine that the uplink message 320-*e* is associated with the CORESET pool index 305-*a*, the uplink message 320-*f* is associated with the CORESET pool index 305-*b*, the uplink message 320-*g* is associated with the CORESET pool index 305-*b*, and the uplink message 320-*h* is associated with the CORESET pool index 305-*a*.

In some cases, the UE may determine that DFI 310-*b* for a HARQ ID 325 is valid based on a last symbol of a respective uplink message 320 being at least the delay 330-*b* before the first symbol of the downlink message 315-*b*. Additionally, the UE may determine whether DFI 310-*b* for the HARQ ID 325 is valid based on a CORESET pool index 305 associated with the respective uplink message 320 being the same as the CORESET pool index 305 associated with the DFI 310-*b*. For example, the UE may determine that DFI 310-*b* associated with the HARQ ID 325-*e* and the HARQ ID 325-*h* is valid based on a last symbol of the uplink message 320-*e* and the uplink message 320-*h* being at least the delay 330-*b* before the first symbol of the downlink message 315-*a*, and based on the uplink message 320-*e* and the uplink message 320-*h* being associated with the CORESET pool index 305-*a*.

Additionally, the UE may determine whether DFI 310-*b* for a HARQ ID 325 is valid based on the last symbol of a respective uplink message 320 being at least a delay 330-*c* (e.g., cg-minDFI-Delay-second-threshold) before the first symbol of the downlink message 315-*b* (e.g., regardless of CORESET pool index 305). In some cases, the delay 330-*c* may be greater than or equal to (e.g., in the case of an ideal backhaul) the delay 330-*b* (e.g., RRC configured) For example, the UE may determine that DFI 310-*b* for the HARQ ID 325-*f* is valid based on a last symbol of the uplink message 320-*f* being at least the delay 330-*b* and at least the delay 330-*c* before the first symbol of the downlink message 315-*b*. Conversely, the UE may determine that DFI 310-*b* for the HARQ ID 325-*g* is not valid based on a last symbol of the uplink message 320-*g* being within the delay 330-*c* before the first symbol of the downlink message 315-*b* (e.g., even though the last symbol of the uplink message 320-*g* is at least the delay 330-*b* before the first symbol of the downlink message 315-*b*).

In some examples, an uplink message 320 (e.g., uplink transmission) may occur over multiple slots such that the DFI 310-*b* may be valid for a HARQ ID 325 based on a last symbol of the uplink message 320 in a first slot from the multiple slots by the delay 330-*c* (e.g., if the DFI 310-*b* for the HARQ ID 325 is ACK). Similarly, an uplink message 320 (e.g., uplink transmission) may occur over multiple slots such that the DFI 310-*b* may be valid for a HARQ ID 325 based on a last symbol of the uplink message 320 in a last slot from the multiple slots by the delay 330-*c* (e.g., if the DFI 310-*b* for the HARQ ID 325 is NACK).

Figure 4:
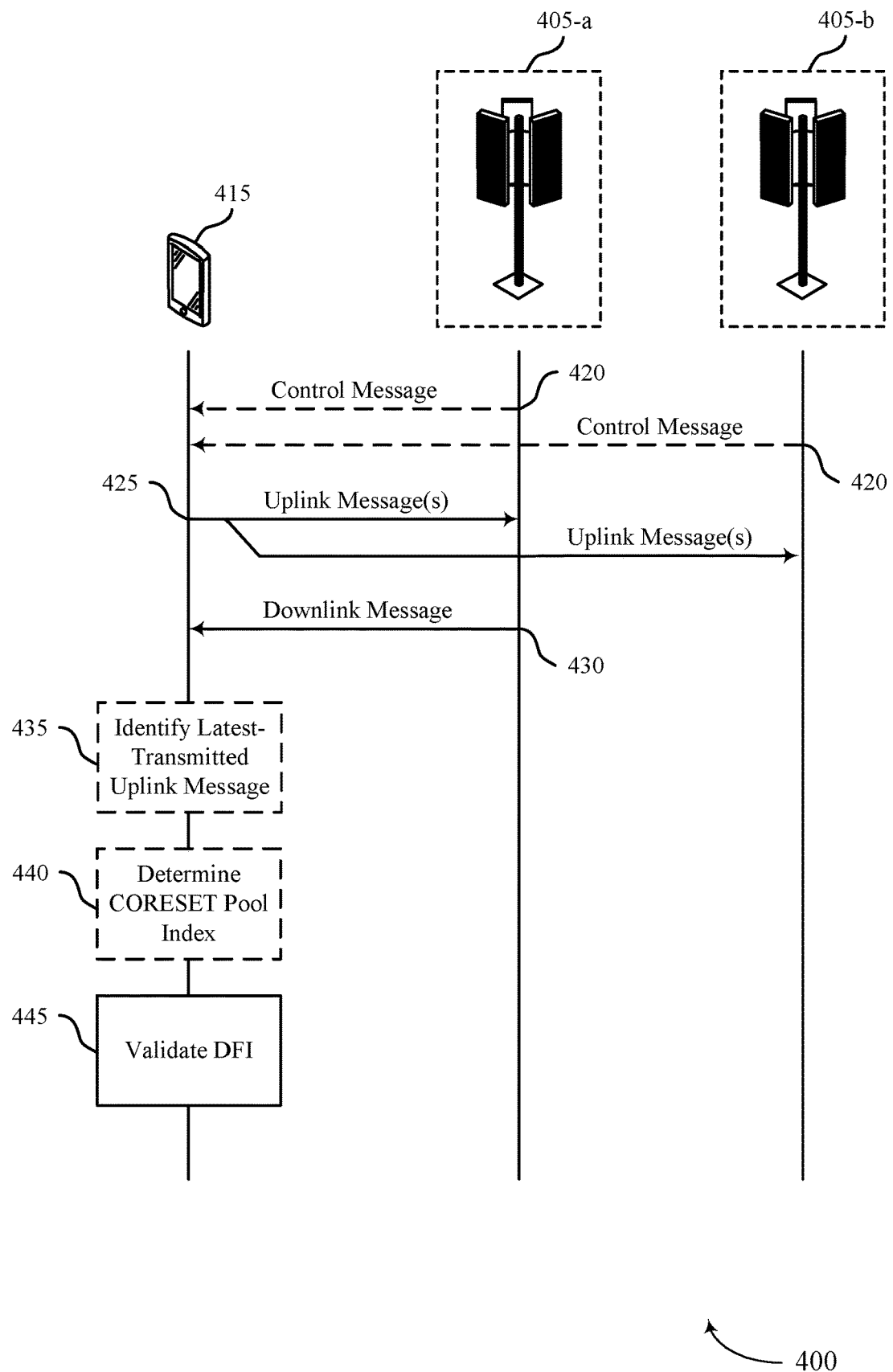
FIG. 4 illustrates an example of a process flow in a system that supports techniques for downlink feedback from multiple transmission and reception points in accordance with one or more aspects of the present disclosure.

FIG. 4 illustrates an example of a process flow 400 in a system that supports techniques for downlink feedback from multiple TRPs in accordance with one or more aspects of the present disclosure. In some examples, the process flow 400 may implement or be implemented by aspects of the wireless communications system 100, the wireless communications system 200, and the validation procedures 300. For example, the process flow 400 may be implemented by one or more network entities 405 (e.g., a network entity 405-*a* and a network entity 405-*b*) and one or more UEs 415 (e.g., a UE 415), which may be examples of the corresponding devices as described herein with reference to FIG. 1. In the example of FIG. 2, the network entity 405 *g* may be an example of a CU 160, a DU 165, an RU 170, a base station 140, an IAB node 104, or one or more other network nodes as described herein with reference to FIG. 1.

In some cases, at 420, the UE 415 may receive one or more control messages from the network entity 405-*a*, the network entity 405-*b*, or both, indicating that each TRP (e.g., corresponding to one or more of the network entity 405-*a* or the network entity 405-*b*), of a set of TRPs transmits respective DFI. In some cases, a first CORESET pool index value may be associated with a TRP of the network entity 405-*a* and a second CORESET pool index value may be associated with a TRP of the network entity 405-*b*.

In some cases, the one or more control messages may indicate one or more CG configurations associated with one or more uplink messages to be transmitted by the UE 415, where each of the one or more configured grant configurations indicates the first CORESET pool index value or the second CORESET pool index value, and where a CORESET pool index value associated with each of one or more uplink messages to be transmitted by the UE 415 is based at least in part on the one or more CG configurations. In some cases, respective DCI activating each of the one or more CG configurations is received via a respective CORESET associated with the first CORESET pool index value or the second CORESET pool index value, and wherein the CORESET pool index value associated with each of the one or more uplink messages is based at least in part on the first CORESET pool index value or the second CORESET pool index value associated with the respective CORESET used to receive the respective DCI.

At 425, the UE 415 may transmit the one or more uplink messages to at least on TRP of a set of TRPs, where each uplink message of the one or more uplink messages is associated with the first CORESET pool index value or the second CORESET pool index value. That is, the UE 415 may transmit one or more uplink messages to the network entity 405-*a*, the network entity 405-*b*. or both. Additionally, each uplink message may be associated with a HARQ ID of a set of HARQ IDs.

At 430, the UE 415 may receive, from a TRP (e.g., corresponding to the network entity 405-*a*), of the set of TRPs, a downlink message indicating DFI for the set of HARQ IDs, where the DFI is associated with the first CORESET pool index value or the second CORESET pool index value. In some cases, the UE 415 may receive the DFI via a CORESET associated with the first CORESET pool index or the second CORESET pool index. In some cases, a CORESET pool index value associated with the DFI corresponds to the first CORESET pool index or the second CORESET pool index used for receiving the downlink message. In some other cases, the UE 415 may receive, within the downlink message, an indication of the CORESET pool index value with the DFI.

In some cases, at 435, the UE 415 may identify a latest-transmitted uplink message of the one or more uplink messages for each HARQ ID of the set of HARQ IDs, the latest-transmitted uplink message for each HARQ ID is identified based at least in part on a first symbol of the downlink message occurring after a last symbol of each latest-transmitted first uplink message by a first time threshold.

In some cases, at 440, the UE 415 may determine a CORESET pool index value associated with at least one uplink message of the one or more uplink messages based on a CORESET pool index value associated with a respective control message scheduling the at least one uplink message, where the CORESET pool index value associated with the respective control message is based at least in part on the CORESET used for receiving the respective control message. In some other cases, the CORESET pool index value associated with each of the one or more uplink messages may be based at least in part on a respective HARQ ID of the set of HARQ IDs that is associated with each uplink message, wherein each HARQ ID corresponds to the first CORESET pool index value or the second CORESET pool index value.

At 445, the UE 415 may determine that the DFI valid for eat least one HARQ ID of the set of HARQ IDs based on the CORESET pool index value associated with the DFI and the CORESET pool index value associated with the at least one uplink message of the one or more uplink messages. In some cases, the UE 415 may determine that the DFI for a first HARQ ID of the set of HARQ IDs is valid based on a first symbol of the downlink message occurring after a last symbol of a first uplink message associated with the first HARQ ID by the first time threshold, where the first time threshold is used for identifying a latest-transmitted uplink message associated with at least one HARQ ID of the set of HARQ IDs. In some cases, the UE 415 may determine whether the DFI is valid based on the control message from the network entity 405-*a*, the network entity 405-*b*, or both.

Additionally, the UE 415 may determine that the DFI for the first HARQ ID of the set of HARQ IDs is valid based on the CORESET pool index value associated with the DFI being the same as a CORESET pool index value associated with the first uplink message.

Additionally, or alternatively, the UE 415 may determine that the DFI for the first HARQ ID of the set of HARQ IDs is valid based on the first symbol of the downlink message occurring after the last symbol of the first uplink message associated with the first HARQ ID by a second time threshold, wherein the CORESET pool index value associated with the DFI is different than the CORESET pool index value associated with the first uplink message. In some cases, the UE 415 may receive control signaling indicating the second time threshold. The second time threshold may be greater than or equal to the first time threshold that is used for identifying the latest-transmitted uplink message associated with the at least one HARQ ID of the set of HARQ IDs.

Figure 5:
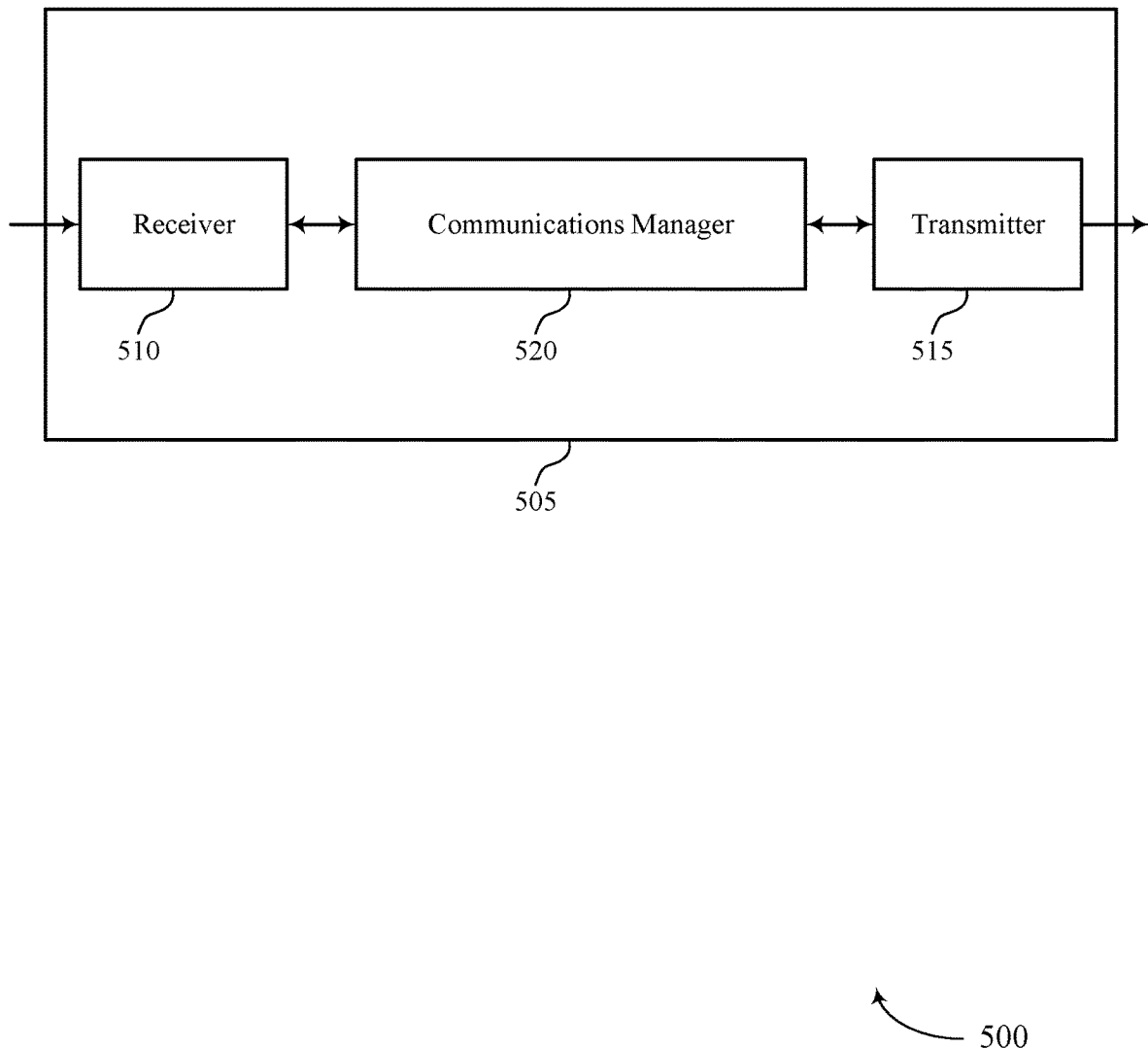
FIGS. 5 and 6 show block diagrams of devices that support techniques for downlink feedback from multiple transmission and reception points in accordance with one or more aspects of the present disclosure.

FIG. 5 shows a block diagram 500 of a device 505 that supports techniques for downlink feedback from multiple TRPs in accordance with one or more aspects of the present disclosure. The device 505 may be an example of aspects of a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to techniques for downlink feedback from multiple TRPs). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to techniques for downlink feedback from multiple TRPs). In some examples, the transmitter 515 may be co-located with a receiver 510 in a transceiver component. The transmitter 515 may utilize a single antenna or a set of multiple antennas.

The communications manager 520, the receiver 510, the transmitter 515, or various combinations thereof or various components thereof may be examples of means for performing various aspects of techniques for downlink feedback from multiple TRPs as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 520, the receiver 510, the transmitter 515, or various combinations or components thereof may be implemented in code (e.g., as communications management software or firmware) executed by a processor. If implemented in code executed by a processor, the functions of the communications manager 520, the receiver 510, the transmitter 515, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 520 may be configured to perform various operations (e.g., receiving, obtaining, monitoring, outputting, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to obtain information, output information, or perform various other operations as described herein.

The communications manager 520 may support wireless communications at a UE in accordance with examples as disclosed herein. For example, the communications manager 520 may be configured as or otherwise support a means for transmitting one or more uplink messages to at least one TRP of a set of multiple TRPs, where each uplink message of the one or more uplink messages is associated with a first CORESET pool index value or a second CORESET pool index value, and where each uplink message is associated with an HARQ ID of a set of HARQ IDs. The communications manager 520 may be configured as or otherwise support a means for receiving, from a TRP of the set of multiple TRPs, a downlink message indicating DFI for the set of HARQ IDs, where the DFI is associated with the first CORESET pool index value or the second CORESET pool index value, and where the DFI is valid for at least one HARQ ID of the set of HARQ IDs based on a CORESET pool index value associated with the DFI and a CORESET pool index value associated with at least one uplink message of the one or more uplink messages.

By including or configuring the communications manager 520 in accordance with examples as described herein, the device 505 (e.g., a processor controlling or otherwise coupled with the receiver 510, the transmitter 515, the communications manager 520, or a combination thereof) may support techniques for validating downlink feedback from multiple TRPs which may result in reduced processing, reduced power consumption, and more efficient utilization of communication resources, among other advantages.

Figure 6:
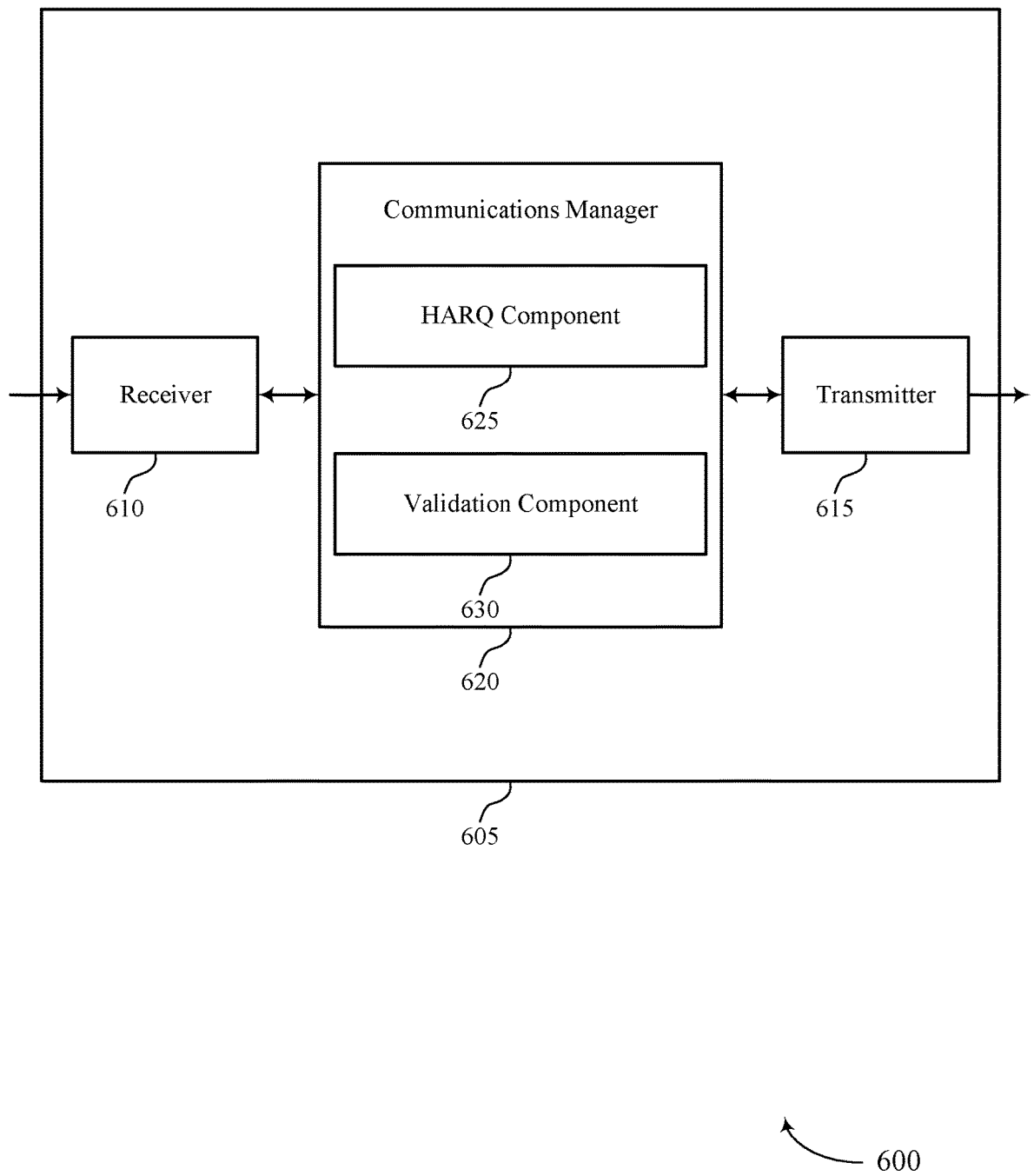

FIG. 6 shows a block diagram 600 of a device 605 that supports techniques for downlink feedback from multiple TRPs in accordance with one or more aspects of the present disclosure. The device 605 may be an example of aspects of a device 505 or a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to techniques for downlink feedback from multiple TRPs). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to techniques for downlink feedback from multiple TRPs). In some examples, the transmitter 615 may be co-located with a receiver 610 in a transceiver component. The transmitter 615 may utilize a single antenna or a set of multiple antennas.

The device 605, or various components thereof, may be an example of means for performing various aspects of techniques for downlink feedback from multiple TRPs as described herein. For example, the communications manager 620 may include an HARQ component 625 a validation component 630, or any combination thereof. The communications manager 620 may be an example of aspects of a communications manager 520 as described herein. In some examples, the communications manager 620, or various components thereof, may be configured to perform various operations (e.g., receiving, obtaining, monitoring, outputting, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to obtain information, output information, or perform various other operations as described herein.

The communications manager 620 may support wireless communications at a UE in accordance with examples as disclosed herein. The HARQ component 625 may be configured as or otherwise support a means for transmitting one or more uplink messages to at least one TRP of a set of multiple TRPs, where each uplink message of the one or more uplink messages is associated with a first CORESET pool index value or a second CORESET pool index value, and where each uplink message is associated with an HARQ ID of a set of HARQ IDs. The validation component 630 may be configured as or otherwise support a means for receiving, from a TRP of the set of multiple TRPs, a downlink message indicating DFI for the set of HARQ IDs, where the DFI is associated with the first CORESET pool index value or the second CORESET pool index value, and where the DFI is valid for at least one HARQ ID of the set of HARQ IDs based on a CORESET pool index value associated with the DFI and a CORESET pool index value associated with at least one uplink message of the one or more uplink messages.

Figure 7:
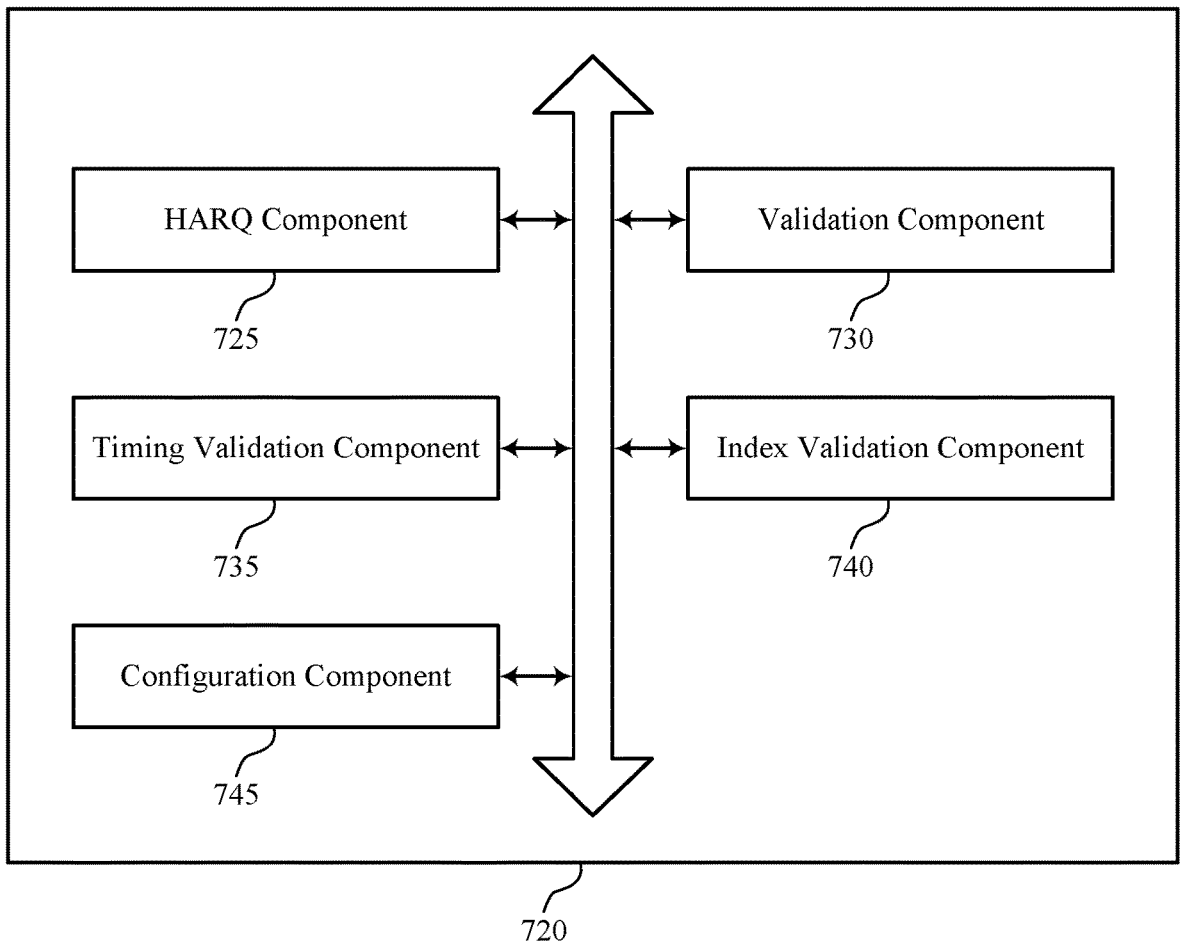
FIG. 7 shows a block diagram of a communications manager that supports techniques for downlink feedback from multiple transmission and reception points in accordance with one or more aspects of the present disclosure.

FIG. 7 shows a block diagram 700 of a communications manager 720 that supports techniques for downlink feedback from multiple TRPs in accordance with one or more aspects of the present disclosure. The communications manager 720 may be an example of aspects of a communications manager 520, a communications manager 620, or both, as described herein. The communications manager 720, or various components thereof, may be an example of means for performing various aspects of techniques for downlink feedback from multiple TRPs as described herein. For example, the communications manager 720 may include an HARQ component 725, a validation component 730, a timing validation component 735, an index validation component 740, a configuration component 745, or any combination thereof. Each of these components may communicate, directly or indirectly, with one another (e.g., via one or more buses).

The communications manager 720 may support wireless communications at a UE in accordance with examples as disclosed herein. The HARQ component 725 may be configured as or otherwise support a means for transmitting one or more uplink messages to at least one TRP of a set of multiple TRPs, where each uplink message of the one or more uplink messages is associated with a first CORESET pool index value or a second CORESET pool index value, and where each uplink message is associated with an HARQ ID of a set of HARQ IDs. The validation component 730 may be configured as or otherwise support a means for receiving, from a TRP of the set of multiple TRPs, a downlink message indicating DFI for the set of HARQ IDs, where the DFI is associated with the first CORESET pool index value or the second CORESET pool index value, and where the DFI is valid for at least one HARQ ID of the set of HARQ IDs based on a CORESET pool index value associated with the DFI and a CORESET pool index value associated with at least one uplink message of the one or more uplink messages.

In some examples, the timing validation component 735 may be configured as or otherwise support a means for determining that the DFI for a first HARQ ID of the set of HARQ IDs is valid based on a first symbol of the downlink message occurring after a last symbol of a first uplink message associated with the first HARQ ID by a first time threshold, where the first time threshold is used for identifying a latest-transmitted uplink message associated with at least one HARQ ID of the set of HARQ IDs.

In some examples, the index validation component 740 may be configured as or otherwise support a means for determining that the DFI for the first HARQ ID of the set of HARQ IDs is valid based on the CORESET pool index value associated with the DFI being the same as a CORESET pool index value associated with the first uplink message.

In some examples, the timing validation component 735 may be configured as or otherwise support a means for determining that the DFI for the first HARQ ID of the set of HARQ IDs is valid based on the first symbol of the downlink message occurring after the last symbol of the first uplink message associated with the first HARQ ID by a second time threshold, where the CORESET pool index value associated with the DFI is different than a CORESET pool index value associated with the first uplink message.

In some examples, the timing validation component 735 may be configured as or otherwise support a means for receiving control signaling indicating the second time threshold.

In some examples, the second time threshold is greater than or equal to the first time threshold that is used for identifying the latest-transmitted uplink message associated with the at least one HARQ ID of the set of HARQ IDs.

In some examples, the validation component 730 may be configured as or otherwise support a means for receiving a control message indicating that each TRP of the set of multiple TRPs transmits respective DFI. In some examples, the validation component 730 may be configured as or otherwise support a means for determining whether the DFI is valid based on the control message.

In some examples, to support receiving the downlink message, the index validation component 740 may be configured as or otherwise support a means for receiving the downlink message via a CORESET associated with the first CORESET pool index value or the second CORESET pool index value, where the CORESET pool index value associated with the DFI corresponds to the first CORESET pool index value or the second CORESET pool index value associated with the CORESET used for receiving the downlink message.

In some examples, the index validation component 740 may be configured as or otherwise support a means for receiving, within the downlink message, an indication of the CORESET pool index value associated with the DFI.

In some examples, the timing validation component 735 may be configured as or otherwise support a means for identifying a latest-transmitted uplink message of the one or more uplink messages for each HARQ ID of the set of HARQ IDs, the latest-transmitted uplink message for each HARQ ID is identified based on a first symbol of the downlink message occurring after a last symbol of each latest-transmitted first uplink message by a time threshold. In some examples, the timing validation component 735 may be configured as or otherwise support a means for determining whether the DFI is valid based on the latest-transmitted uplink message for each HARQ ID.

In some examples, the index validation component 740 may be configured as or otherwise support a means for determining the CORESET pool index value associated with the at least one uplink message based on a CORESET pool index value associated with a respective control message scheduling the at least one uplink message, where the CORESET pool index value associated with the respective control message is based on a CORESET used for receiving the respective control message.

In some examples, the configuration component 745 may be configured as or otherwise support a means for receiving one or more control messages indicating one or more configured grant configurations associated with the one or more uplink messages, where each of the one or more configured grant configurations indicates the first CORESET pool index value or the second CORESET pool index value, and where the CORESET pool index value associated with each of the one or more uplink messages is based on the one or more configured grant configurations.

In some examples, the configuration component 745 may be configured as or otherwise support a means for receiving one or more control messages indicating one or more configured grant configurations associated with the one or more uplink messages, where respective downlink control information activating each of the one or more configured grant configurations is received via a respective CORESET associated with the first CORESET pool index value or the second CORESET pool index value, and where the CORESET pool index value associated with each of the one or more uplink messages is based on the first CORESET pool index value or the second CORESET pool index value associated with the respective CORESET used to receive the respective downlink control information.

In some examples, the CORESET pool index value associated with each of the one or more uplink messages is based on a respective HARQ ID of the set of HARQ IDs that is associated with each uplink message. In some examples, each HARQ ID corresponds to the first CORESET pool index value or the second CORESET pool index value.

In some examples, the first CORESET pool index value is associated with a first TRP of the set of multiple TRPs and the second CORESET pool index value is associated with a second TRP of the set of multiple TRPs.

Figure 8:
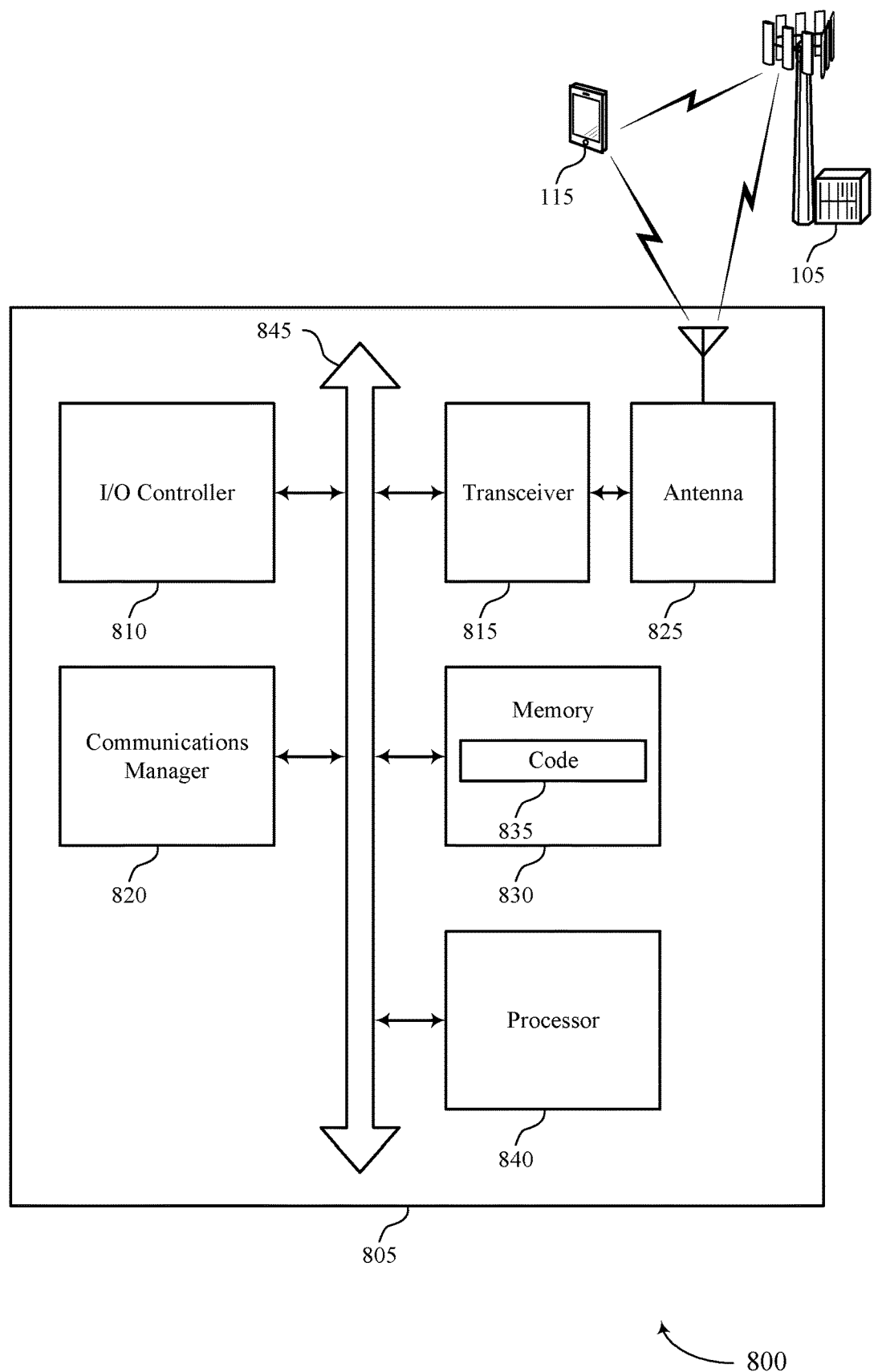
FIG. 8 shows a diagram of a system including a device that supports techniques for downlink feedback from multiple transmission and reception points in accordance with one or more aspects of the present disclosure.

FIG. 8 shows a diagram of a system 800 including a device 805 that supports techniques for downlink feedback from multiple TRPs in accordance with one or more aspects of the present disclosure. The device 805 may be an example of or include the components of a device 505, a device 605, or a UE 115 as described herein. The device 805 may communicate (e.g., wirelessly) with one or more network entities 105, one or more UEs 115, or any combination thereof. The device 805 may include components for bi-directional voice and data communications including components for transmitting and receiving communications, such as a communications manager 820, an input/output (I/O) controller 810, a transceiver 815, an antenna 825, a memory 830, code 835, and a processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally, or alternatively, the I/O controller 810 may represent or interact with a modem, a keyboard, a mouse, a touchscreen, or a similar device. In some cases, the I/O controller 810 may be implemented as part of a processor, such as the processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include random access memory (RAM) and read-only memory (ROM). The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some cases, the code 835 may not be directly executable by the processor 840 but may cause a computer (e.g., when compiled and executed) to perform functions described herein. In some cases, the memory 830 may contain, among other things, a basic I/O system (BIOS) which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting techniques for downlink feedback from multiple TRPs). For example, the device 805 or a component of the device 805 may include a processor 840 and memory 830 coupled with or to the processor 840, the processor 840 and memory 830 configured to perform various functions described herein.

The communications manager 820 may support wireless communications at a UE in accordance with examples as disclosed herein. For example, the communications manager 820 may be configured as or otherwise support a means for transmitting one or more uplink messages to at least one TRP of a set of multiple TRPs, where each uplink message of the one or more uplink messages is associated with a first CORESET pool index value or a second CORESET pool index value, and where each uplink message is associated with an HARQ ID of a set of HARQ IDs. The communications manager 820 may be configured as or otherwise support a means for receiving, from a TRP of the set of multiple TRPs, a downlink message indicating DFI for the set of HARQ IDs, where the DFI is associated with the first CORESET pool index value or the second CORESET pool index value, and where the DFI is valid for at least one HARQ ID of the set of HARQ IDs based on a CORESET pool index value associated with the DFI and a CORESET pool index value associated with at least one uplink message of the one or more uplink messages.

By including or configuring the communications manager 820 in accordance with examples as described herein, the device 805 may support techniques for validating downlink feedback from multiple TRPs which may result in improved communication reliability, reduced latency, improved user experience related to reduced processing, reduced power consumption, more efficient utilization of communication resources, improved coordination between devices, longer battery life, and improved utilization of processing capability, among other advantages.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of techniques for downlink feedback from multiple TRPs as described herein, or the processor 840 and the memory 830 may be otherwise configured to perform or support such operations.

Figure 9:
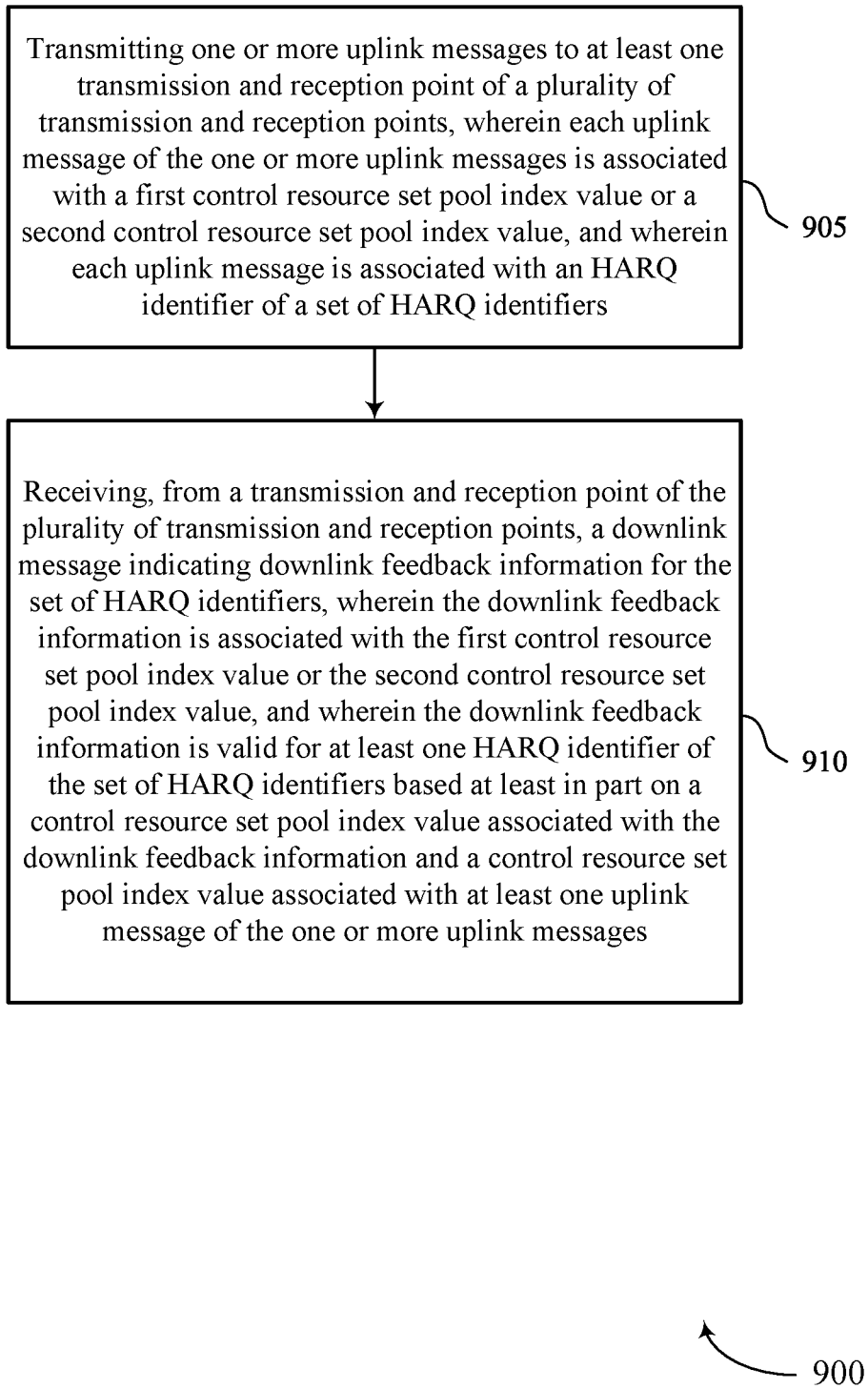
FIGS. 9 through 11 show flowcharts illustrating methods that support techniques for downlink feedback from multiple transmission and reception points in accordance with one or more aspects of the present disclosure.

FIG. 9 shows a flowchart illustrating a method 900 that supports techniques for downlink feedback from multiple TRPs in accordance with one or more aspects of the present disclosure. The operations of the method 900 may be implemented by a UE or its components as described herein. For example, the operations of the method 900 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 905, the method may include transmitting one or more uplink messages to at least one TRP of a set of multiple TRPs, where each uplink message of the one or more uplink messages is associated with a first CORESET pool index value or a second CORESET pool index value, and where each uplink message is associated with an HARQ ID of a set of HARQ IDs. The operations of 905 may be performed in accordance with examples as disclosed herein. In some examples, aspects of the operations of 905 may be performed by an HARQ component 725 as described with reference to FIG. 7.

At 910, the method may include receiving, from a TRP of the set of multiple TRPs, a downlink message indicating DFI for the set of HARQ IDs, where the DFI is associated with the first CORESET pool index value or the second CORESET pool index value, and where the DFI is valid for at least one HARQ ID of the set of HARQ IDs based on a CORESET pool index value associated with the DFI and a CORESET pool index value associated with at least one uplink message of the one or more uplink messages. The operations of 910 may be performed in accordance with examples as disclosed herein. In some examples, aspects of the operations of 910 may be performed by a validation component 730 as described with reference to FIG. 7.

Figure 10:
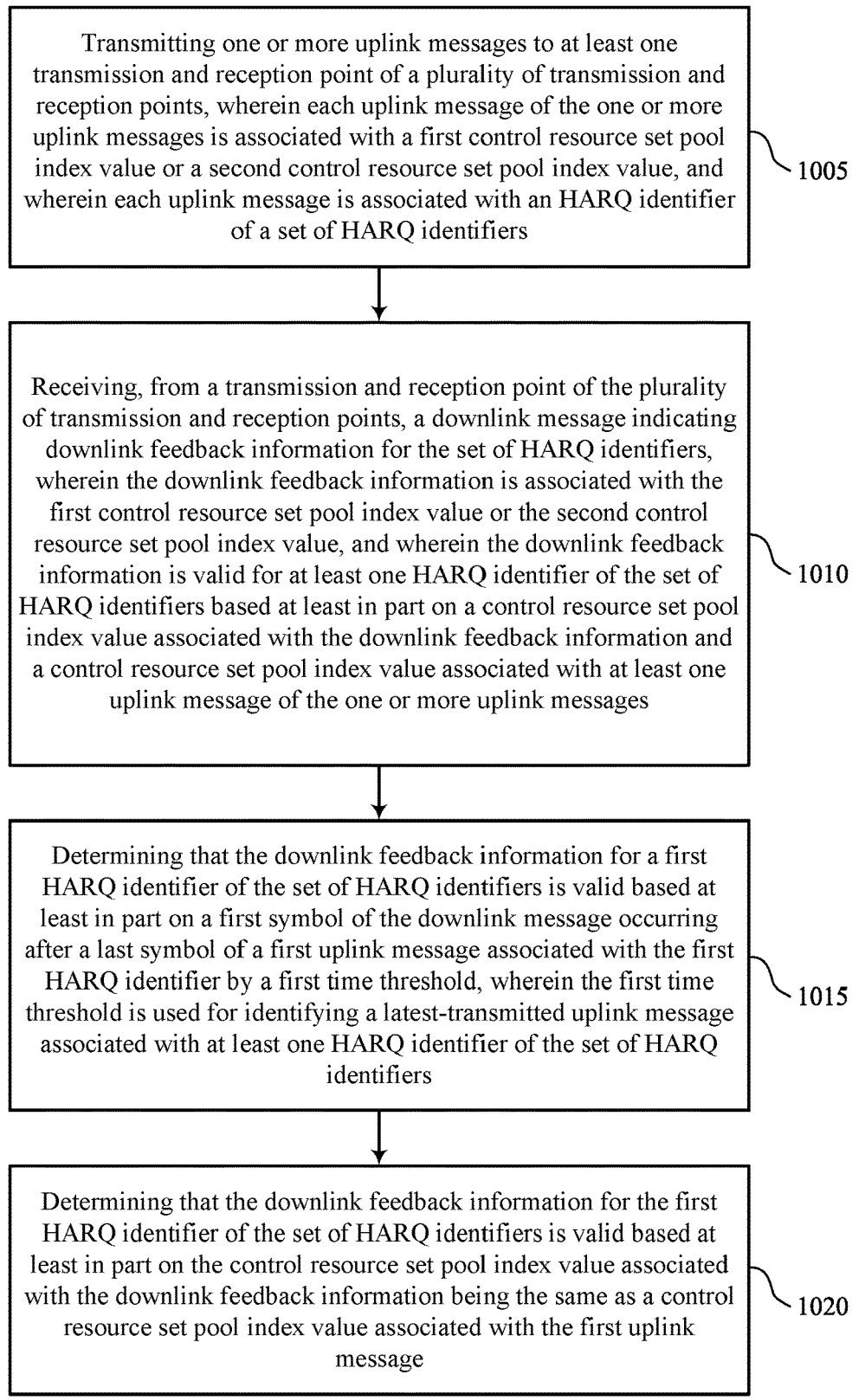

FIG. 10 shows a flowchart illustrating a method 1000 that supports techniques for downlink feedback from multiple TRPs in accordance with one or more aspects of the present disclosure. The operations of the method 1000 may be implemented by a UE or its components as described herein. For example, the operations of the method 1000 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1005, the method may include transmitting one or more uplink messages to at least one TRP of a set of multiple TRPs, where each uplink message of the one or more uplink messages is associated with a first CORESET pool index value or a second CORESET pool index value, and where each uplink message is associated with an HARQ ID of a set of HARQ IDs. The operations of 1005 may be performed in accordance with examples as disclosed herein. In some examples, aspects of the operations of 1005 may be performed by an HARQ component 725 as described with reference to FIG. 7.

At 1010, the method may include receiving, from a TRP of the set of multiple TRPs, a downlink message indicating DFI for the set of HARQ IDs, where the DFI is associated with the first CORESET pool index value or the second CORESET pool index value, and where the DFI is valid for at least one HARQ ID of the set of HARQ IDs based on a CORESET pool index value associated with the DFI and a CORESET pool index value associated with at least one uplink message of the one or more uplink messages. The operations of 1010 may be performed in accordance with examples as disclosed herein. In some examples, aspects of the operations of 1010 may be performed by a validation component 730 as described with reference to FIG. 7.

At 1015, the method may include determining that the DFI for a first HARQ ID of the set of HARQ IDs is valid based on a first symbol of the downlink message occurring after a last symbol of a first uplink message associated with the first HARQ ID by a first time threshold, where the first time threshold is used for identifying a latest-transmitted uplink message associated with at least one HARQ ID of the set of HARQ IDs. The operations of 1015 may be performed in accordance with examples as disclosed herein. In some examples, aspects of the operations of 1015 may be performed by a timing validation component 735 as described with reference to FIG. 7.

At 1020, the method may include determining that the DFI for the first HARQ ID of the set of HARQ IDs is valid based on the CORESET pool index value associated with the DFI being the same as a CORESET pool index value associated with the first uplink message. The operations of 1020 may be performed in accordance with examples as disclosed herein. In some examples, aspects of the operations of 1020 may be performed by an index validation component 740 as described with reference to FIG. 7.

Figure 11:
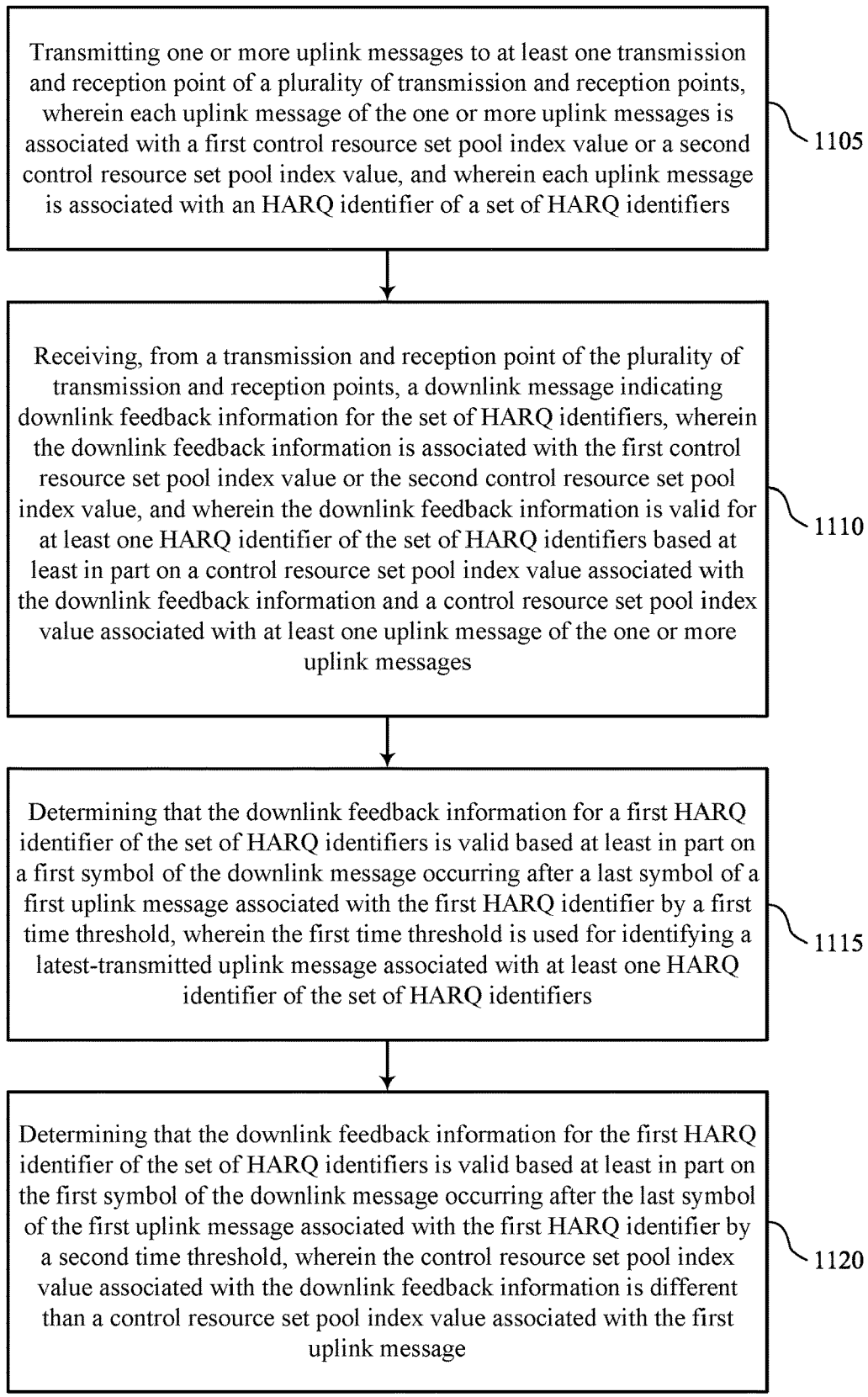

FIG. 11 shows a flowchart illustrating a method 1100 that supports techniques for downlink feedback from multiple TRPs in accordance with one or more aspects of the present disclosure. The operations of the method 1100 may be implemented by a UE or its components as described herein. For example, the operations of the method 1100 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1105, the method may include transmitting one or more uplink messages to at least one TRP of a set of multiple TRPs, where each uplink message of the one or more uplink messages is associated with a first CORESET pool index value or a second CORESET pool index value, and where each uplink message is associated with an HARQ ID of a set of HARQ IDs. The operations of 1105 may be performed in accordance with examples as disclosed herein. In some examples, aspects of the operations of 1105 may be performed by an HARQ component 725 as described with reference to FIG. 7.

At 1110, the method may include receiving, from a TRP of the set of multiple TRPs, a downlink message indicating DFI for the set of HARQ IDs, where the DFI is associated with the first CORESET pool index value or the second CORESET pool index value, and where the DFI is valid for at least one HARQ ID of the set of HARQ IDs based on a CORESET pool index value associated with the DFI and a CORESET pool index value associated with at least one uplink message of the one or more uplink messages. The operations of 1110 may be performed in accordance with examples as disclosed herein. In some examples, aspects of the operations of 1110 may be performed by a validation component 730 as described with reference to FIG. 7.

At 1115, the method may include determining that the DFI for a first HARQ ID of the set of HARQ IDs is valid based on a first symbol of the downlink message occurring after a last symbol of a first uplink message associated with the first HARQ ID by a first time threshold, where the first time threshold is used for identifying a latest-transmitted uplink message associated with at least one HARQ ID of the set of HARQ IDs. The operations of 1115 may be performed in accordance with examples as disclosed herein. In some examples, aspects of the operations of 1115 may be performed by a timing validation component 735 as described with reference to FIG. 7.

At 1120, the method may include determining that the DFI for the first HARQ ID of the set of HARQ IDs is valid based on the first symbol of the downlink message occurring after the last symbol of the first uplink message associated with the first HARQ ID by a second time threshold, where the CORESET pool index value associated with the DFI is different than a CORESET pool index value associated with the first uplink message. The operations of 1120 may be performed in accordance with examples as disclosed herein. In some examples, aspects of the operations of 1120 may be performed by a timing validation component 735 as described with reference to FIG. 7.

The following provides an overview of aspects of the present disclosure:

Aspect 1: A method for wireless communications at a UE, comprising: transmitting one or more uplink messages to at least one TRP of a plurality of TRPs, wherein each uplink message of the one or more uplink messages is associated with a first CORESET pool index value or a second CORESET pool index value, and wherein each uplink message is associated with an HARQ ID of a set of HARQ IDs; and receiving, from a TRP of the plurality of TRPs, a downlink message indicating DFI for the set of HARQ IDs, wherein the DFI is associated with the first CORESET pool index value or the second CORESET pool index value, and wherein the DFI is valid for at least one HARQ ID of the set of HARQ IDs based at least in part on a CORESET pool index value associated with the DFI and a CORESET pool index value associated with at least one uplink message of the one or more uplink messages.

Aspect 2: The method of aspect 1, further comprising: determining that the DFI for a first HARQ ID of the set of HARQ IDs is valid based at least in part on a first symbol of the downlink message occurring after a last symbol of a first uplink message associated with the first HARQ ID by a first time threshold, wherein the first time threshold is used for identifying a latest-transmitted uplink message associated with at least one HARQ ID of the set of HARQ IDs.

Aspect 3: The method of aspect 2, further comprising: determining that the DFI for the first HARQ ID of the set of HARQ IDs is valid based at least in part on the CORESET pool index value associated with the DFI being the same as a CORESET pool index value associated with the first uplink message.

Aspect 4: The method of aspect 2, further comprising: determining that the DFI for the first HARQ ID of the set of HARQ IDs is valid based at least in part on the first symbol of the downlink message occurring after the last symbol of the first uplink message associated with the first HARQ ID by a second time threshold, wherein the CORESET pool index value associated with the DFI is different than a CORESET pool index value associated with the first uplink message.

Aspect 5: The method of aspect 4, further comprising: receiving control signaling indicating the second time threshold.

Aspect 6: The method of any of aspects 4 through 5, wherein the second time threshold is greater than or equal to the first time threshold that is used for identifying the latest-transmitted uplink message associated with the at least one HARQ ID of the set of HARQ IDs.

Aspect 7: The method of any of aspects 1 through 6, further comprising: receiving a control message indicating that each TRP of the plurality of TRPs transmits respective DFI; and determining whether the DFI is valid based at least in part on the control message.

Aspect 8: The method of any of aspects 1 through 7, wherein receiving the downlink message comprises: receiving the downlink message via a CORESET associated with the first CORESET pool index value or the second CORESET pool index value, wherein the CORESET pool index value associated with the DFI corresponds to the first CORESET pool index value or the second CORESET pool index value associated with the CORESET used for receiving the downlink message.

Aspect 9: The method of any of aspects 1 through 7, further comprising: receiving, within the downlink message, an indication of the CORESET pool index value associated with the DFI.

Aspect 10: The method of any of aspects 1 through 9, further comprising: identifying a latest-transmitted uplink message of the one or more uplink messages for each HARQ ID of the set of HARQ IDs, the latest-transmitted uplink message for each HARQ ID is identified based at least in part on a first symbol of the downlink message occurring after a last symbol of each latest-transmitted first uplink message by a time threshold; and determining whether the DFI is valid based at least in part on the latest-transmitted uplink message for each HARQ ID.

Aspect 11: The method of any of aspects 1 through 10, further comprising: determining the CORESET pool index value associated with the at least one uplink message based at least in part on a CORESET pool index value associated with a respective control message scheduling the at least one uplink message, wherein the CORESET pool index value associated with the respective control message is based at least in part on a CORESET used for receiving the respective control message.

Aspect 12: The method of any of aspects 1 through 10, further comprising: receiving one or more control messages indicating one or more configured grant configurations associated with the one or more uplink messages, wherein each of the one or more configured grant configurations indicates the first CORESET pool index value or the second CORESET pool index value, and wherein the CORESET pool index value associated with each of the one or more uplink messages is based at least in part on the one or more configured grant configurations.

Aspect 13: The method of any of aspects 1 through 10, further comprising: receiving one or more control messages indicating one or more configured grant configurations associated with the one or more uplink messages, wherein respective downlink control information activating each of the one or more configured grant configurations is received via a respective CORESET associated with the first CORESET pool index value or the second CORESET pool index value, and wherein the CORESET pool index value associated with each of the one or more uplink messages is based at least in part on the first CORESET pool index value or the second CORESET pool index value associated with the respective CORESET used to receive the respective downlink control information.

Aspect 14: The method of any of aspects 1 through 10, wherein the CORESET pool index value associated with each of the one or more uplink messages is based at least in part on a respective HARQ ID of the set of HARQ IDs that is associated with each uplink message, each HARQ ID corresponds to the first CORESET pool index value or the second CORESET pool index value.

Aspect 15: The method of any of aspects 1 through 14, wherein the first CORESET pool index value is associated with a first TRP of the plurality of TRPs and the second CORESET pool index value is associated with a second TRP of the plurality of TRPs.

Aspect 16: An apparatus for wireless communications at a UE, comprising a processor; memory coupled with the processor; and instructions stored in the memory and executable by the processor to cause the apparatus to perform a method of any of aspects 1 through 15.

Aspect 17: An apparatus for wireless communications at a UE, comprising at least one means for performing a method of any of aspects 1 through 15.

Aspect 18: A non-transitory computer-readable medium storing code for wireless communications at a UE, the code comprising instructions executable by a processor to perform a method of any of aspects 1 through 15.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communications at a user equipment (UE), comprising:

transmitting one or more uplink messages to at least one transmission and reception point of a plurality of transmission and reception points, wherein each uplink message of the one or more uplink messages is associated with a first control resource set pool index value or a second control resource set pool index value, and wherein each uplink message is associated with a hybrid automatic repeat request (HARQ) identifier of a set of HARQ identifiers;

receiving, from a transmission and reception point of the plurality of transmission and reception points, a downlink message indicating downlink feedback information for the set of HARQ identifiers, wherein the downlink feedback information is associated with the first control resource set pool index value or the second control resource set pool index value, and wherein the downlink feedback information is valid for at least one HARQ identifier of the set of HARQ identifiers based at least in part on a control resource set pool index value associated with the downlink feedback information and a control resource set pool index value associated with at least one uplink message of the one or more uplink messages; and determining that the downlink feedback information for a first HARQ identifier of the set of HARQ identifiers is valid based at least in part on a first symbol of the downlink message occurring after a last symbol of a first uplink message associated with the first HARQ identifier by a first time threshold, wherein the first time threshold is used for identifying a latest-transmitted uplink message associated with at least one HARQ identifier of the set of HARQ identifiers.

2. The method of claim 1, further comprising:
determining that the downlink feedback information for the first HARQ identifier of the set of HARQ identifiers is valid based at least in part on the control resource set pool index value associated with the downlink feedback information being the same as a control resource set pool index value associated with the first uplink message.

3. The method of claim 1, further comprising:
determining that the downlink feedback information for the first HARQ identifier of the set of HARQ identifiers is valid based at least in part on the first symbol of the downlink message occurring after the last symbol of the first uplink message associated with the first HARQ identifier by a second time threshold, wherein the control resource set pool index value associated with the downlink feedback information is different than a control resource set pool index value associated with the first uplink message.

4. The method of claim 3, further comprising:
receiving control signaling indicating the second time threshold.

5. The method of claim 3, wherein the second time threshold is greater than or equal to the first time threshold that is used for identifying the latest-transmitted uplink message associated with the at least one HARQ identifier of the set of HARQ identifiers.

6. The method of claim 1, further comprising:
receiving a control message indicating that each transmission and reception point of the plurality of transmission and reception points transmits respective downlink feedback information; and
determining whether the downlink feedback information is valid based at least in part on the control message.

7. The method of claim 1, wherein receiving the downlink message comprises:
receiving the downlink message via a control resource set associated with the first control resource set pool index value or the second control resource set pool index value, wherein the control resource set pool index value associated with the downlink feedback information corresponds to the first control resource set pool index value or the second control resource set pool index value associated with the control resource set used for receiving the downlink message.

8. The method of claim 1, further comprising:
receiving, within the downlink message, an indication of the control resource set pool index value associated with the downlink feedback information.

9. The method of claim 1, further comprising:
identifying a latest-transmitted uplink message of the one or more uplink messages for each HARQ identifier of the set of HARQ identifiers, the latest-transmitted uplink message for each HARQ identifier is identified based at least in part on a first symbol of the downlink message occurring after a last symbol of each latest-transmitted first uplink message by a time threshold; and
determining whether the downlink feedback information is valid based at least in part on the latest-transmitted uplink message for each HARQ identifier.

10. The method of claim 1, further comprising:
determining the control resource set pool index value associated with the at least one uplink message based at least in part on a control resource set pool index value associated with a respective control message scheduling the at least one uplink message, wherein the control resource set pool index value associated with the respective control message is based at least in part on a control resource set used for receiving the respective control message.

11. The method of claim 1, further comprising:
receiving one or more control messages indicating one or more configured grant configurations associated with the one or more uplink messages, wherein each of the one or more configured grant configurations indicates the first control resource set pool index value or the second control resource set pool index value, and wherein the control resource set pool index value associated with each of the one or more uplink messages is based at least in part on the one or more configured grant configurations.

12. The method of claim 1, further comprising:
receiving one or more control messages indicating one or more configured grant configurations associated with the one or more uplink messages, wherein respective downlink control information activating each of the one or more configured grant configurations is received via a respective control resource set associated with the first control resource set pool index value or the second control resource set pool index value, and wherein the control resource set pool index value associated with each of the one or more uplink messages is based at least in part on the first control resource set pool index value or the second control resource set pool index value associated with the respective control resource set used to receive the respective downlink control information.

13. The method of claim 1, wherein the control resource set pool index value associated with each of the one or more uplink messages is based at least in part on a respective HARQ identifier of the set of HARQ identifiers that is associated with each uplink message, wherein each HARQ identifier corresponds to the first control resource set pool index value or the second control resource set pool index value.

14. The method of claim 1, wherein the first control resource set pool index value is associated with a first transmission and reception point of the plurality of transmission and reception points and the second control resource set pool index value is associated with a second transmission and reception point of the plurality of transmission and reception points.

15. An apparatus for wireless communications at a user equipment (UE), comprising:
a processor;
memory coupled with the processor; and
instructions stored in the memory and executable by the processor to cause the apparatus to:
transmit one or more uplink messages to at least one transmission and reception point of a plurality of transmission and reception points, wherein each uplink message of the one or more uplink messages is associated with a first control resource set pool index value or a second control resource set pool index value, and wherein each uplink message is associated with a hybrid automatic repeat request (HARQ) identifier of a set of HARQ identifiers;
receive, from a transmission and reception point of the plurality of transmission and reception points, a downlink message indicating downlink feedback information for the set of HARQ identifiers, wherein the downlink feedback information is associated with the first control resource set pool index value or the second control resource set pool index value, and wherein the downlink feedback information is valid for at least one HARQ identifier of the set of HARQ identifiers based at least in part on a control resource set pool index value associated with the downlink feedback information and a control resource set pool index value associated with at least one uplink message of the one or more uplink messages; and determine that the downlink feedback information for a first HARQ identifier of the set of HARQ identifiers is valid based at least in part on a first symbol of the downlink message occurring after a last symbol of a first uplink message associated with the first HARQ identifier by a first time threshold, wherein the first time threshold is used for identifying a latest-transmitted uplink message associated with at least one HARQ identifier of the set of HARQ identifiers.

16. The apparatus of claim 15, wherein the instructions are further executable by the processor to cause the apparatus to:

determine that the downlink feedback information for the first HARQ identifier of the set of HARQ identifiers is valid based at least in part on the control resource set pool index value associated with the downlink feedback information being the same as a control resource set pool index value associated with the first uplink message.

17. The apparatus of claim 15, wherein the instructions are further executable by the processor to cause the apparatus to:

determine that the downlink feedback information for the first HARQ identifier of the set of HARQ identifiers is valid based at least in part on the first symbol of the downlink message occurring after the last symbol of the first uplink message associated with the first HARQ identifier by a second time threshold, wherein the control resource set pool index value associated with the downlink feedback information is different than a control resource set pool index value associated with the first uplink message.

18. The apparatus of claim 17, wherein the instructions are further executable by the processor to cause the apparatus to:

receive control signaling indicating the second time threshold.

19. The apparatus of claim 17, wherein the second time threshold is greater than or equal to the first time threshold that is used for identifying the latest-transmitted uplink message associated with the at least one HARQ identifier of the set of HARQ identifiers.

20. The apparatus of claim 15, wherein the instructions are further executable by the processor to cause the apparatus to:

receive a control message indicating that each transmission and reception point of the plurality of transmission and reception points transmits respective downlink feedback information; and determine whether the downlink feedback information is valid based at least in part on the control message.

21. The apparatus of claim 15, wherein the instructions to receive the downlink message are executable by the processor to cause the apparatus to:

receive the downlink message via a control resource set associated with the first control resource set pool index value or the second control resource set pool index value, wherein the control resource set pool index value associated with the downlink feedback information corresponds to the first control resource set pool index value or the second control resource set pool index value associated with the control resource set used for receiving the downlink message.

22. The apparatus of claim 15, wherein the instructions are further executable by the processor to cause the apparatus to:

receive, within the downlink message, an indication of the control resource set pool index value associated with the downlink feedback information.

23. The apparatus of claim 15, wherein the instructions are further executable by the processor to cause the apparatus to:

identify a latest-transmitted uplink message of the one or more uplink messages for each HARQ identifier of the set of HARQ identifiers, the latest-transmitted uplink message for each HARQ identifier is identified based at least in part on a first symbol of the downlink message occurring after a last symbol of each latest-transmitted first uplink message by a time threshold; and determine whether the downlink feedback information is valid based at least in part on the latest-transmitted uplink message for each HARQ identifier.

24. The apparatus of claim 15, wherein the instructions are further executable by the processor to cause the apparatus to:

determine the control resource set pool index value associated with the at least one uplink message based at least in part on a control resource set pool index value associated with a respective control message scheduling the at least one uplink message, wherein the control resource set pool index value associated with the respective control message is based at least in part on a control resource set used for receiving the respective control message.

25. The apparatus of claim 15, wherein the instructions are further executable by the processor to cause the apparatus to:

receive one or more control messages indicating one or more configured grant configurations associated with the one or more uplink messages, wherein each of the one or more configured grant configurations indicates the first control resource set pool index value or the second control resource set pool index value, and wherein the control resource set pool index value associated with each of the one or more uplink messages is based at least in part on the one or more configured grant configurations.

26. The apparatus of claim 15, wherein the instructions are further executable by the processor to cause the apparatus to:

receive one or more control messages indicating one or more configured grant configurations associated with the one or more uplink messages, wherein respective downlink control information activating each of the one or more configured grant configurations is received via a respective control resource set associated with the first control resource set pool index value or the second control resource set pool index value, and wherein the control resource set pool index value associated with each of the one or more uplink messages is based at least in part on the first control resource set pool index value or the second control resource set pool index value associated with the respective control resource set used to receive the respective downlink control information.

27. An apparatus for wireless communications at a user equipment (UE), comprising:
- means for transmitting one or more uplink messages to at least one transmission and reception point of a plurality of transmission and reception points, wherein each uplink message of the one or more uplink messages is associated with a first control resource set pool index value or a second control resource set pool index value, and wherein each uplink message is associated with a hybrid automatic repeat request (HARQ) identifier of a set of HARQ identifiers;
- means for receiving, from a transmission and reception point of the plurality of transmission and reception points, a downlink message indicating downlink feedback information for the set of HARQ identifiers, wherein the downlink feedback information is associated with the first control resource set pool index value or the second control resource set pool index value, and wherein the downlink feedback information is valid for at least one HARQ identifier of the set of HARQ identifiers based at least in part on a control resource set pool index value associated with the downlink feedback information and a control resource set pool index value associated with at least one uplink message of the one or more uplink messages; and
- means for determining that the downlink feedback information for a first HARQ identifier of the set of HARQ identifiers is valid based at least in part on a first symbol of the downlink message occurring after a last symbol of a first uplink message associated with the first HARQ identifier by a first time threshold, wherein the first time threshold is used for identifying a latest-transmitted uplink message associated with at least one HARQ identifier of the set of HARQ identifiers.

28. A non-transitory computer-readable medium storing code for wireless communications at a user equipment (UE), the code comprising instructions executable by a processor to:
- transmit one or more uplink messages to at least one transmission and reception point of a plurality of transmission and reception points, wherein each uplink message of the one or more uplink messages is associated with a first control resource set pool index value or a second control resource set pool index value, and wherein each uplink message is associated with a hybrid automatic repeat request (HARQ) identifier of a set of HARQ identifiers;
- receive, from a transmission and reception point of the plurality of transmission and reception points, a downlink message indicating downlink feedback information for the set of HARQ identifiers, wherein the downlink feedback information is associated with the first control resource set pool index value or the second control resource set pool index value, and wherein the downlink feedback information is valid for at least one HARQ identifier of the set of HARQ identifiers based at least in part on a control resource set pool index value associated with the downlink feedback information and a control resource set pool index value associated with at least one uplink message of the one or more uplink messages; and
- determine that the downlink feedback information for a first HARQ identifier of the set of HARQ identifiers is valid based at least in part on a first symbol of the downlink message occurring after a last symbol of a first uplink message associated with the first HARQ identifier by a first time threshold, wherein the first time threshold is used for identifying a latest-transmitted uplink message associated with at least one HARQ identifier of the set of HARQ identifiers.

* * * * *